US012639048B2

(12) United States Patent
Procopio et al.

(10) Patent No.: US 12,639,048 B2
(45) Date of Patent: May 26, 2026

(54) VISUAL CONFIGURATION AND PROGRAMMATIC DEPLOYMENT OF NO-CODE CHAT APPS

(71) Applicant: Google LLC, Mountain View, CA (US)

(72) Inventors: Michael Jeffrey Procopio, Boulder, CO (US); Nicholas Eric Westbury, Seattle, WA (US); Sarmad Hashmi, San Jose, CA (US); Rachel Goodman Moore, Kirkland, WA (US); Francis Herrera Cortez, San Bruno, CA (US)

(73) Assignee: Google LLC, Mountain View, CA (US)

( * ) Notice: Subject to any disclaimer, the term of this patent is extended or adjusted under 35 U.S.C. 154(b) by 63 days.

(21) Appl. No.: 18/313,226

(22) Filed: May 5, 2023

(65) Prior Publication Data

US 2024/0370234 A1     Nov. 7, 2024

(51) Int. Cl.
| | |
|---|---|
| *G06F 8/34* | (2018.01) |
| *G06F 8/60* | (2018.01) |
| *G06F 8/77* | (2018.01) |
| *H04L 9/40* | (2022.01) |

(52) U.S. Cl.
CPC .................. *G06F 8/34* (2013.01); *G06F 8/60* (2013.01); *G06F 8/77* (2013.01); *H04L 63/08* (2013.01)

(58) Field of Classification Search
CPC ..................................... G06F 8/34; G06F 8/60
See application file for complete search history.

(56) References Cited

U.S. PATENT DOCUMENTS

| | | | |
|---|---|---|---|
| 10,466,981 B1 | 11/2019 | MacMillan et al. | |
| 10,656,907 B2 | 5/2020 | Seolas et al. | |

| | | | |
|---|---|---|---|
| 11,163,960 B2 * | 11/2021 | Saha ...................... G06F 40/295 |
| 11,381,666 B1 | 7/2022 | Stalioraitis et al. | |
| 11,870,741 B2 * | 1/2024 | John ....................... H04L 67/51 |

(Continued)

FOREIGN PATENT DOCUMENTS

| | | | | |
|---|---|---|---|---|
| CN | 108090035 A | 5/2018 | | |
| CN | 116414368 A | * | 7/2023 | ............... G06F 8/34 |

OTHER PUBLICATIONS

Keisala, Jukka. "Utilizing Large Language Models as No-code Interface in a Software Development Toolkit." (2023).*

(Continued)

*Primary Examiner* — Francisco J Aponte

(74) *Attorney, Agent, or Firm* — Shumaker & Sieffert, P.A.

(57)          ABSTRACT

A method for deploying no-code chat applications includes receiving, from a user, a chat application deployment request requesting deployment of a chat application. The chat application is derived from a no-code application that was generated using a no-code application development environment. The method includes obtaining credentials associated with the user. The method includes generating, using the credentials, a project container for the chat application. The method also includes generating, using the no-code application and the no-code application development environment, the chat application at the project container. The method includes receiving, from the user, parameters for the chat application, the parameters defining user interaction with the chat application. The method also includes configuring, via an application programming interface (API), the chat application using the parameters and deploying the chat application.

20 Claims, 20 Drawing Sheets

(56)　　　　　References Cited

U.S. PATENT DOCUMENTS

| | | | |
|---|---|---|---|
| 11,922,143 B1 * | 3/2024 | Shapiro | G06F 8/34 |
| 12,079,584 B2 * | 9/2024 | Dua | G06F 8/35 |
| 2003/0115142 A1 | 6/2003 | Brickell et al. | |
| 2005/0102534 A1 | 5/2005 | Wong | |
| 2006/0248406 A1 | 11/2006 | Qing et al. | |
| 2008/0040681 A1 | 2/2008 | Synstelien et al. | |
| 2008/0052348 A1 | 2/2008 | Adler et al. | |
| 2013/0024808 A1 | 1/2013 | Rainisto | |
| 2014/0067702 A1 | 3/2014 | Rathod | |
| 2016/0210361 A1 | 7/2016 | Pistoia et al. | |
| 2016/0321222 A1 | 11/2016 | Greenberg et al. | |
| 2016/0357373 A1 | 12/2016 | Greenberg et al. | |
| 2018/0024814 A1 | 1/2018 | Ouali | |
| 2018/0054464 A1 | 2/2018 | Zhang et al. | |
| 2018/0107461 A1 * | 4/2018 | Balasubramanian | G06F 8/38 |
| 2018/0219921 A1 * | 8/2018 | Baer | H04L 51/046 |
| 2018/0285084 A1 | 10/2018 | Mimlitch, III et al. | |
| 2019/0073197 A1 * | 3/2019 | Collins | G06F 8/60 |
| 2019/0268178 A1 | 8/2019 | Fairweather et al. | |
| 2019/0391823 A1 | 12/2019 | Jouhier | |
| 2019/0394150 A1 * | 12/2019 | Denoue | G06Q 10/101 |
| 2020/0153750 A1 | 5/2020 | Petys et al. | |
| 2020/0272114 A1 | 8/2020 | Grabowski et al. | |
| 2020/0301678 A1 * | 9/2020 | Burman | G06F 9/541 |
| 2020/0374244 A1 | 11/2020 | John et al. | |
| 2021/0042094 A1 * | 2/2021 | Burman | G06F 8/34 |
| 2021/0044546 A1 * | 2/2021 | Taslimi | G06F 40/174 |
| 2021/0064349 A1 | 3/2021 | Allgeier et al. | |
| 2021/0064685 A1 | 3/2021 | Weizman et al. | |
| 2021/0089618 A1 | 3/2021 | Jain et al. | |
| 2021/0141616 A1 | 5/2021 | Kane | |
| 2021/0141617 A1 | 5/2021 | Burman et al. | |
| 2021/0337249 A1 * | 10/2021 | Jain | H04N 21/2387 |
| 2022/0060435 A1 * | 2/2022 | Whitten | G06F 8/38 |
| 2022/0129257 A1 | 4/2022 | Touati et al. | |
| 2022/0244925 A1 * | 8/2022 | Moss | G10L 15/183 |
| 2022/0366147 A1 * | 11/2022 | Ho | G06F 40/35 |
| 2022/0374209 A1 * | 11/2022 | Shek | G06F 8/33 |
| 2022/0405068 A1 | 12/2022 | Brown et al. | |
| 2023/0107316 A1 * | 4/2023 | Ripa | G05B 13/04 700/29 |
| 2023/0110941 A1 | 4/2023 | Makhija et al. | |
| 2023/0125807 A1 * | 4/2023 | Ripa | G06F 3/0482 715/771 |
| 2023/0185544 A1 | 6/2023 | Procopia et al. | |
| 2023/0334395 A1 | 10/2023 | Gorrono et al. | |
| 2023/0339102 A1 * | 10/2023 | Tapus | G06F 9/547 |
| 2023/0393832 A1 * | 12/2023 | Touati | H04L 67/10 |
| 2024/0111504 A1 | 4/2024 | Procopia et al. | |
| 2024/0231766 A1 * | 7/2024 | Ferreira | G06F 8/71 |
| 2024/0256784 A1 * | 8/2024 | Harris | H04L 51/02 |
| 2024/0272877 A1 * | 8/2024 | Girdhar | G06F 8/33 |
| 2024/0370234 A1 * | 11/2024 | Procopio | G06F 8/60 |
| 2024/0412157 A1 * | 12/2024 | Manzano | G06Q 10/087 |
| 2025/0068396 A1 | 2/2025 | Procopio et al. | |

OTHER PUBLICATIONS

Masili, Giorgia. "No-code development platforms: breaking the boundaries between IT and business experts." International Journal of Economic Behavior (IJEB) 13.1 (2023): 33-49.*

Haile, Redeat Kassa. "Implementing a Low-Code AI-Based Chatbot on Azure combined with Boomi Integration." (2022).*

U.S. Appl. No. 18/628,375, filed Apr. 5, 2024, naming inventors Procopio et al.

Response to Office Action dated May 8, 2025 from U.S. Appl. No. 17/937,375, filed Aug. 8, 2025, 11 pp.

ElBatanony, Ahmed, and Giancarlo Succi. "Towards the no-code era: a vision and plan for the future of software development." Proceedings of the 1st ACM SIGPLAN International Workshop on Beyond Code: No Code. 2021. (Year: 2021) 7 pp.

Google for Developers, "Authenticate as a Google Chat app", Oct. 2022, 7 pp.

Google for Developers, "Build an HTTP Google Chat app", Oct. 2022, 6 pp.

International Search Report and Written Opinion for related PCT Application No. PCT/US2023/034047, dated Feb. 1, 2024, 6 pp.

Office Action from U.S. Appl. No. 17/937,375 dated May 8, 2025, 23 pp. 23 pp.

Sahay, Apurvanand, et al. "Supporting the understanding and comparison of low-code development platforms." 2020 46th Euromicro Conference on Software Engineering and Advanced Applications (SEAA). IEEE, 2020. (Year: 2020) 8 pp.

Weber, Irene. "Low-code from frontend to backend: Connecting conversational user interfaces to backend services via a low-code IoT platform." Proceedings of the 3rd Conference on Conversational User Interfaces. 2021. (Year: 2021) 5 pp.

Lugovsky, "Low Code vs No Code: Full Analysis 2025", UI Bakery, Inc., Aug. 14, 2023, 15 pp.

Talesra et al., "Low-Code Platform for Application Development", International Journal of Applied Engineering Research, vol. 16, No. 5, May 31, 2021, 6 pp.

"AppSheet—Wikipedia", Wikipedia, 2023, 5 pp., Retrieved from the Internet on November 17, 2025 URL: https://en.wikipedia.org/w/index.php?title=AppSheet&oldid=1163700647.

"Run your app in an iFrame on a web page—AppSheet Help", Google, 2022, 1 pp., Retrieved from the Internet on Nov. 17, 2025 from URL: https://web.archive.org/web/20220528202500/support.google.com/appsheet/answer/10104491.

"Send an email from an automation—AppSheet Help", Google, 2022, 10 pp., Retrieved from the Internet on Nov. 17, 2025 from URL: https://web.archive.org/web/20221104135615/https://support.google.com/appsheet/answer/11447614.

Matt, "How To Create A Clickable Link To A Specific Record (for an AppSheet app)", MultiTech Visions, Mar. 16, 2023, 7 pp., Retrieved from the Internet on Nov. 24, 2025 from URL: https://www.multitechvisions.com/post/how-to-create-a-clickable-link-to-a-specific-record-for-an-appsheet-app.

Gwendal et al., "Xatkit: a multimodal low-code chatbot development framework", IEEE Access, vol. 8, Jan. 27, 2020, 15 pp.

Notice of Allowance from U.S. Appl. No. 17/937,375 dated Dec. 18, 2025, 10 pp.

* cited by examiner

800C

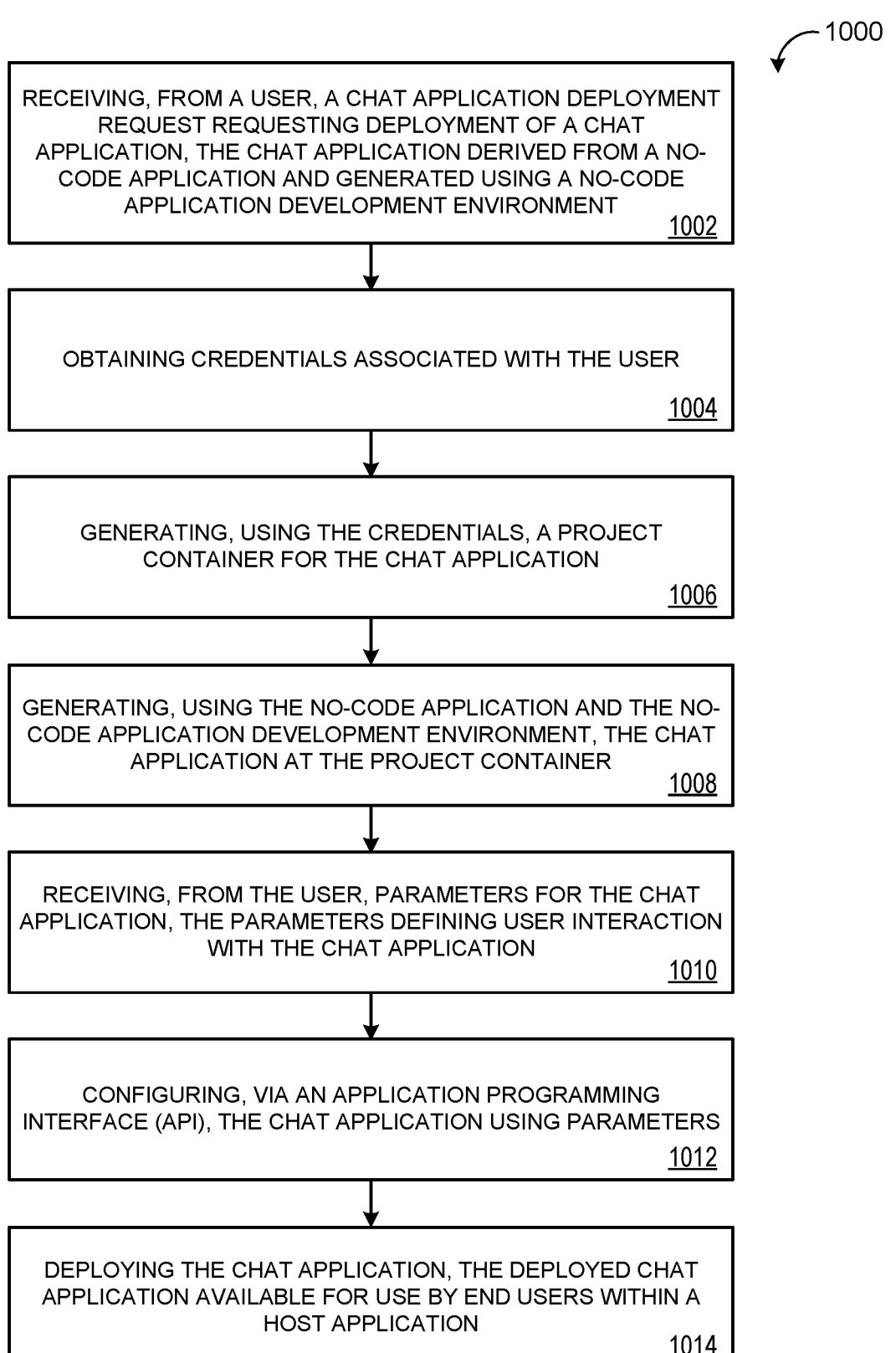

RECEIVING, FROM A USER, A CHAT APPLICATION DEPLOYMENT REQUEST REQUESTING DEPLOYMENT OF A CHAT APPLICATION, THE CHAT APPLICATION DERIVED FROM A NO-CODE APPLICATION AND GENERATED USING A NO-CODE APPLICATION DEVELOPMENT ENVIRONMENT

1002

OBTAINING CREDENTIALS ASSOCIATED WITH THE USER

1004

GENERATING, USING THE CREDENTIALS, A PROJECT CONTAINER FOR THE CHAT APPLICATION

1006

GENERATING, USING THE NO-CODE APPLICATION AND THE NO-CODE APPLICATION DEVELOPMENT ENVIRONMENT, THE CHAT APPLICATION AT THE PROJECT CONTAINER

1008

RECEIVING, FROM THE USER, PARAMETERS FOR THE CHAT APPLICATION, THE PARAMETERS DEFINING USER INTERACTION WITH THE CHAT APPLICATION

1010

CONFIGURING, VIA AN APPLICATION PROGRAMMING INTERFACE (API), THE CHAT APPLICATION USING PARAMETERS

1012

DEPLOYING THE CHAT APPLICATION, THE DEPLOYED CHAT APPLICATION AVAILABLE FOR USE BY END USERS WITHIN A HOST APPLICATION

VISUAL CONFIGURATION AND PROGRAMMATIC DEPLOYMENT OF NO-CODE CHAT APPS

TECHNICAL FIELD

This disclosure relates to visual configuration and programmatic deployment of no-code chat applications (apps).

BACKGROUND

No-code development platforms allow programmers and non-programmers to create application software via graphical user interfaces as opposed to conventional programming techniques. Thus, no-code platforms enable business technologists and citizen developers of all skill levels to build power applications and workflows for their organizations without the need to write any code.

Chat applications may be web applications or services that execute within a chat application. For example, chat applications may receive synchronous chat events (e.g., a message is received or a user was added to the conversation) and respond with an appropriate message (e.g., static text or complex dialog) or update an existing message. Chat applications are increasingly used to deliver round-the-clock support to both internal and external customers, thereby helping many industries streamline and optimize the customer experience.

SUMMARY

One aspect of the disclosure provides a computer-implemented method for configuration and deployment of chat applications. The method, when executed by data processing hardware, causes the data processing hardware to perform operations. The operations include receiving, from a user, a chat application deployment request requesting deployment of a chat application. The chat application is derived from a no-code application and the no-code application is generated using a no-code application development environment. The operations include obtaining credentials associated with the user and generating, using the credentials, a project container for the chat application. The operations include generating, using the no-code application and the no-code application development environment, the chat application at the project container. The operations also include receiving, from the user, parameters for the chat application. The parameters define user interactions with the chat application. The operations also include configuring, via an application programming interface (API), the chat application using the parameters. The operations also include deploying the chat application. The deployed chat application is available for use by end users within a host application.

Implementations of the disclosure may include one or more of the following optional features. In some implementations, the credentials are uniquely associated with the user. In other implementations, the user is associated with an organization and the credentials are uniquely associated with the organization. In some of these implementations, the project container is programmatically generated within a cloud platform instance associated with the organization. In some examples, the no-code application is generated prior to receiving the chat application deployment request.

In some implementations, the parameters include configuration of one or more slash commands for the chat application. In some of these implementations, the one or more slash commands include one or more of a slash command to open an application view configured to view, create, or modify a data record, a slash command to trigger an action of the no-code application, or a slash command to perform natural language searching of one or more data records associated with the chat application. The parameters may include one or more of a name associated with the chat application, a description of the chat application, or a slash command definition.

Optionally, receiving the parameters includes generating one or more template interactions. Each template interaction of the one or more template interactions may define an interaction with the chat application. Receiving the parameters may also include sending the one or more template interactions to a user device associated with the user and receiving, from the user, selection of one of the one or more template interactions. At least one of the one or more template interactions may be derived from interactions defined in the no-code application.

Another aspect of the disclosure provides a system for configuration and deployment of chat applications. The system includes data processing hardware and memory hardware in communication with the data processing hardware. The memory hardware stores instructions that when executed on the data processing hardware cause the data processing hardware to perform operations. The operations include receiving, from a user, a chat application deployment request requesting deployment of a chat application. The chat application is derived from a no-code application and the no-code application is generated using a no-code application development environment. The operations include obtaining credentials associated with the user and generating, using the credentials, a project container for the chat application. The operations include generating, using the no-code application and the no-code application development environment, the chat application at the project container. The operations also include receiving, from the user, parameters for the chat application. The parameters define user interactions with the chat application. The operations also include configuring, via an application programming interface (API), the chat application using the parameters. The operations also include deploying the chat application. The deployed chat application is available for use by end users within a host application.

This aspect may include one or more of the following optional features. In some implementations, the credentials are uniquely associated with the user. In other implementations, the user is associated with an organization and the credentials are uniquely associated with the organization. In some of these implementations, the project container is programmatically generated within a cloud platform instance associated with the organization. In some examples, the no-code application is generated prior to receiving the chat application deployment request.

In some implementations, the parameters include configuration of one or more slash commands for the chat application. In some of these implementations, the one or more slash commands include one or more of a slash command to open an application view configured to view, create, or modify a data record, a slash command to trigger an action of the no-code application, or a slash command to perform natural language searching of one or more data records associated with the chat application. The parameters may include one or more of a name associated with the chat application, a description of the chat application, or a slash command definition.

Optionally, receiving the parameters includes generating one or more template interactions. Each template interaction of the one or more template interactions may define an interaction with the chat application. Receiving the parameters may also include sending the one or more template interactions to a user device associated with the user and receiving, from the user, selection of one of the one or more template interactions. At least one of the one or more template interactions may be derived from interactions defined in the no-code application.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 10 a flowchart of an example arrangement of operations for a method of configuration and deployment of chat applications.

Like reference symbols in the various drawings indicate like elements.

DETAILED DESCRIPTION

Figure 1:
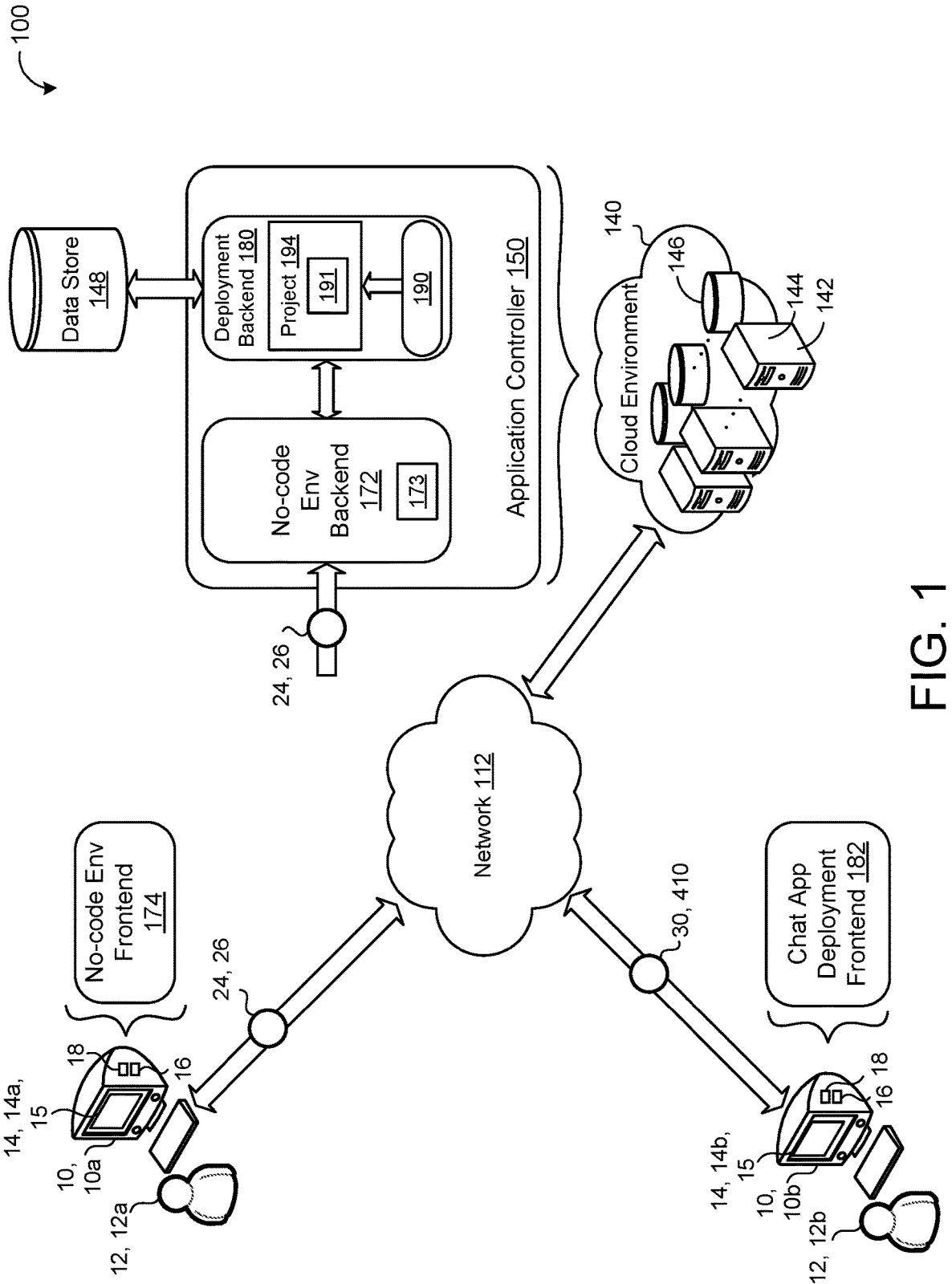
FIG. 1 is a schematic view of an example system for configuration and deployment of chat applications.

Chat applications may be web applications or services that execute within a chat application. For example, chat applications may receive synchronous chat events (e.g., a message is received or a user was added to the conversation) and respond with an appropriate message (e.g., static text or complex dialog) or update an existing message. Chat applications are increasingly used to deliver round-the-clock support to both internal and external customers, thereby helping many industries streamline and optimize the customer experience.

Chat applications (i.e., chat "apps" or "chat bots") are, at a basic level, computer programs that simulate and process human conversation (either written or spoken), allowing users to interact with digital devices as if they were communicating with a real person. Chat application users may interact with the chat application via freeform natural language or by way of more structured approaches (e.g., slash commands). In many ways, chat applications can be thought of as "chat wrappers" around applications, automations, and third party integrations with external data sources that allow those functions to be called and interacted with in chat, so that the user never has to leave their conversation to get data or perform a task. An ideal chat application allows users to perform virtually any data push, pull, or push and pull interaction with virtually any data source without taking the user out of their immediate context. Chat applications may be hosted by a "host platform" or "host application." The host application is an application that allows the user to interact with the chat application. For example, the host application may be an email client that "hosts" the chat app by providing renderings of the chat app to the user and receiving user interactions as the user interacts with the chat app.

Chat applications may be segmented into two primary categories. First, public, consumer-facing chat applications provide customer service such as to provide feedback on a recent purchase. These are commonly referred to as external chat applications. Private, organization-specific chat applications may be designed to address specific needs within a company such as file vacation requests, assist with inventory lookups, manage approval flows, post new sales deals, or provide information about a bug or service outage. These are conventionally referred to as internal chat applications.

External chat applications are mainly served by purpose-built products and the organizations that build them. In contrast, internal chat applications are often add-ons (native or otherwise) to a company's synchronous messaging platform. This allows the chat applications to be able to "meet users where they are at" to provide a quick, on-demand answer or complete an otherwise time consuming task to save significant resources.

No-code development platforms allow programmers and non-programmers to create application software via graphical user interfaces as opposed to conventional programming techniques. Thus, no-code platforms enable business technologists and citizen developers of all skill levels to build power applications and workflows for their organizations without the need to write any code. Combining no-code development platforms with chat applications democratizes the chat application creation process so that anyone, in any role, has the skill needed to set up a chat application.

Implementations herein include systems and methods that provide application creators the ability to one-click publish and deploy chat applications to allow end users the ability to interact with automations without leaving a chat application environment. In this way, users (e.g., citizen developers) without traditional software engineering skill sets may configure and deploy no-code chat applications. The implementations include visual specifications of key configuration parameters and programmatically creating a chat application entity with the user specified configuration parameters. Within the chat application environment, users interact with the chat applications using, for example, chat cards and/or dialogs. Based on user-initiated events within the chat application environment, the chat application executes automations that may interact with external data sources (e.g., tables, databases, etc.). The chat applications may send messages to a user or chat space based on automation triggers.

Referring to FIG. 1, in some implementations, a chat application generation system 100 includes a remote system 140 in communication with one or more user devices 10 each associated with a respective user 12 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 148 (i.e., a remote storage device) may be overlain on the storage resources 146 to allow scalable use of the storage resources 146 by one or more of the clients (e.g., the user device 10) or the computing resources 144.

The remote system 140 is configured to communicate with the user devices 10 via, for example, the network 112. The user device(s) 10 may correspond to any computing device, such as a desktop workstation, a laptop workstation, or a mobile device (i.e., a smart phone). Each user device 10 includes computing resources 18 (e.g., data processing hardware) and/or storage resources 16 (e.g., memory hardware). The data processing hardware 18 executes a graphical user interface (GUI) 14 for display on a screen 15 in communication with the data processing hardware 18.

The remote system 140 executes an application controller 150. The application controller 150 includes a no-code environment backend 172 (e.g., a no-code application development environment). A first user 12, 12a may communicate with the no-code environment backend 172 via, for example, a first user device 10, 10a and a no-code environment frontend 174 provided by the no-code environment backend 172. For example, the user 12a interacts with the no-code environment frontend 174 using a first GUI 14, 14a displayed on the screen 15. The combination of the no-code environment backend 172 and the no-code environment frontend 174 comprise a no-code environment. As discussed in more detail below, the GUI 14a provided by the no-code environment backend 172 may be a web-based GUI 14 (e.g., accessed via a web browser) and provides the user 12a with an interactive, visual workspace to build, execute, and publish no-code applications 190. In other examples, the no-code environment frontend 174 is executed by an application executing on the first user device 10a. The GUI 14a, for example, allows the user 12a to drag and drop application routines or subroutines into an editing area where they may be connected to form an application 190. Notably, the user 12 does not require programming skills to generate the application 190. For example, the user 12a selects one or more trigger conditions 510 such as a modification to a data repository (e.g., a row being added to a table or a database or a row being updated/modified) and automations or actions or action responses (e.g., sending a notification, calling a script, etc.) that the application 190 executes in response to a trigger condition being satisfied. The application 190 may interact with data stored at the data store 148. For example, the application 190 may monitor for changes within data stored at the data store 148 for the trigger condition and/or modify data stored at the data store 148 for the action response. The user 12a may select a data source for the application 190. For example, the user 12a directs the application controller 150 to one or more data elements (e.g., tables, databases, etc.) stored at the data store 148 when generating the application 190. The application 190 may support many different use cases, such as email automation (e.g., sending customized messages to internal or external users), creating invoices/decks/reports (e.g., generating files at a specified location using templated content), connecting services (e.g., send/return data from external services), and/or scheduling automated data manipulation/logic (e.g., run advanced business logic on data).

In some implementations, during or after the user 12a configures the application 190 (e.g., sets one or more trigger conditions and one or more action responses), the user 12a may publish and/or deploy the application 190 as a chat application 191 using the chat application deployment backend 180 via a deployment request 24. For example, the user 12a, while selecting deployment or publishing options, selects a chat application option, causing the application controller 150 to deploy the application 190 as a chat application 191 in addition to alternatively to a traditional application. In other examples, the user 12a selects a previously generated and deployed no-code application 190 (i.e., deployed prior to the deployment request 24) and regenerates and/or redeploys the application 190 as a chat application 191 (e.g., in addition to the originally deployed application 190).

The chat application deployment backend 180 may execute the chat application 191 and expose the chat application 191 via the chat application deployment frontend 182 (i.e., a chat application environment frontend) to a second user 12, 12b. The combination of the chat application deployment backend 180 and the chat application deployment frontend 182 together provide a chat application environment. The second user 12b may be the same or different from the first user 12a. That is, the application controller 150 may deploy the chat application 191 for a user 12 that is different from the user 12 that authored the chat application 191. The second user 12b, for example, interacts with the chat application 191 via a second GUI 14, 14b executing on a second user device 10, 10b. The second GUI 14b allows the second user 12b to interact with the chat application deployment frontend 182 to, for example, send and receive messages with other users 12. The chat application deployment frontend 182 may execute on the second user device 10b, the first user device 10a, another user device (not shown), the remote system 140, or any combination thereof.

The user 12b may interact with the chat application 191 via a host application or host platform. For example, the host application is an email client that allows the user 12b to read and compose emails. In this example, the user device 10b may render views of the chat application 191 within the email client such that the user 12b may interact with the chat application 191 while using the email client. The host application may execute locally on the user device 10 or remotely (e.g., on the remote system 140) and accessed by the user device 10 via the network 112. The host application may include any type of application, such as email clients, document editors, software code editors, third-party application host containers, etc.

In some implementations, the application controller 150, in response to the deployment request 24 from the user 12a, obtains credentials 173 associated with the user 12a. In some examples, the application controller 150 receives the credentials 173 from the user 12a (e.g., via the deployment request 24). The credentials 173 may be uniquely associated with the user 12a (e.g., a username and password of the user 12a). In other examples, the credentials 173 are uniquely associated with an organization that is associated with the user 12a. For example, the user 12a may be employed by an organization and the user 12a submits the deployment request 24 within the scope of their employment. In this example, the application controller 150 may retrieve credentials associated with the organization (and that are not uniquely associated with the user 12a). In this way, the credentials of the organization may enable one or more features (e.g., chat application deployment) without having to provide the specific user 12a with credentials with sufficient authority to enable the one or more features. More specifically, the credentials associated with the organization may permit generation/deployment of chat applications (and/or any ancillary features required for such deployment) while the user's credentials may not permit such generation/deployment. By leveraging the credentials of the organization (via permission of the organization, such as via a configuration option available to administrators of the organization), the application controller 150 may allow the user 12a to generate and/or deploy chat applications 191 on the organization's behalf.

In some examples, the application controller 150, using the credentials 173, generates a project container 194 for the chat application 191. The project container 194 may provide organization for resources of the resources of the remote system 140 assigned to the user 12a. The project container 194 may include a list of authorized users, a set of application programming interfaces (APIs), and various settings (e.g., billing settings, authentication settings, monitoring settings for the APIs, etc.). The application controller 150 may determine whether the credentials 173 used are authorized to create the project container 194. In some examples, the project container 194 is generated within a cloud platform instance associated with an organization associated with the user 12a. For example, an organization that employs the user 12a may operate a cloud platform instance that hosts a large number of project containers 194 for any number of uses for its employees, customers, or others. The deployment request 24 may cause the application controller 150 to generate the project container 194 for the chat application 191 within the cloud platform instance of the organization.

In some implementations, the application controller 150 automatically generates the project container 194 programmatically for the use 12a without any additional user intervention beyond the deployment request 24 and the credentials 173. Conventionally, generation of such projects (e.g., cloud projects) requires many steps by the user, however the application controller 150 abstracts this away from the user by programmatically creating or generating the project container 194 (e.g., via one or more APIs).

The user 12a and the application controller 150, using no-code application 190 and the no-code environment, generates the chat application 191 at the project container 194. That is, the application controller 150, based on the deployment request 24, adjusts or modifies an instance of the no-code application 190 such that the modified application is appropriate for a chat application 191. The chat application 191 maintains the same underlying features as the no-code application. In some implementations, the chat application 191 is a special or modified deployment of the no-code application 190.

The application controller 150 receives, from the user 12a, one or more parameters 26 for the chat application 191. The parameters 26 may, among other things, define user interaction with the chat application 191. That is, the parameters 26 define ways for users to call, query, or otherwise interact with the chat application 191. For example, the parameters 26 define one or more "slash commands," emojis, or other keyword that triggers a specific interaction with the chat application 191 (.e.g., a "/inventory" slash command that triggers rendering of a view of current inventory within the chat application 191 and/or host application). The slash commands may define any number of interactions with or behaviors of the chat application 191. For example, a slash command may open an application view configured for creation and/or modification and/or viewing of a data record (e.g., a data record stored at the data store 148), while another slash command may trigger an action of the no-code application 190 (i.e., an automation or additional set of programmatic sequences or functionality), such as sending an email or calling a script that executes. Yet another slash command may perform natural language searching of one or more data records associated with the chat application 191 or no-code application 190.

The parameters 26 may include other information regarding the chat application 191. For example, the parameters 26 include a name associated with the chat application 191, a description of the chat application 191, branding of the chat application 191, etc. The parameters 26 may include authorization parameters, such as what users 12 and/or organizations may access the chat application 191.

As discussed in more detail below, in some implementations, the application controller 150 generates one or more template interactions that each defines an interaction with the chat application 191. For example, a slash command that causes an entry to be added to a database is a template interaction. The application controller 150 may send the template interaction(s) to the user device 10a and then receive, from the user 12a, selection of one or more of the template interactions. That is, one or more of the parameters 26 received from the user 12a may be in response to suggestions or recommendations proposed by the application controller 150. For example, when the no-code application 190 that is the basis of the chat application 191 includes the ability to modify an underlying database, the application controller 150 automatically suggests one or more template interactions that allow a user 12 of the chat application 191 to perform the same ability using chat functionality (e.g., a slash command). Thus, the template interactions may be specifically derived from interactions defined in the no-code application 190. In other examples, the template interactions include default interactions commonly used with chat application 191 (e.g., a "help" slash command).

The application controller 150 configures, via one or more APIs, the chat application 191 using the parameters 26. In some implementations, the application controller 150 programmatically configures the chat application 191. After configuring the chat application 191 with the parameters 26, the deployment backend 180 deploys the chat application 191. Once deployed, the chat application 191 is available for end users (e.g., the user 12b) within a host application for the host platform. For example, the user 12b may add the chat application 191 to an email client to enable the chat functionality provided by the chat application 191.

Figure 2:
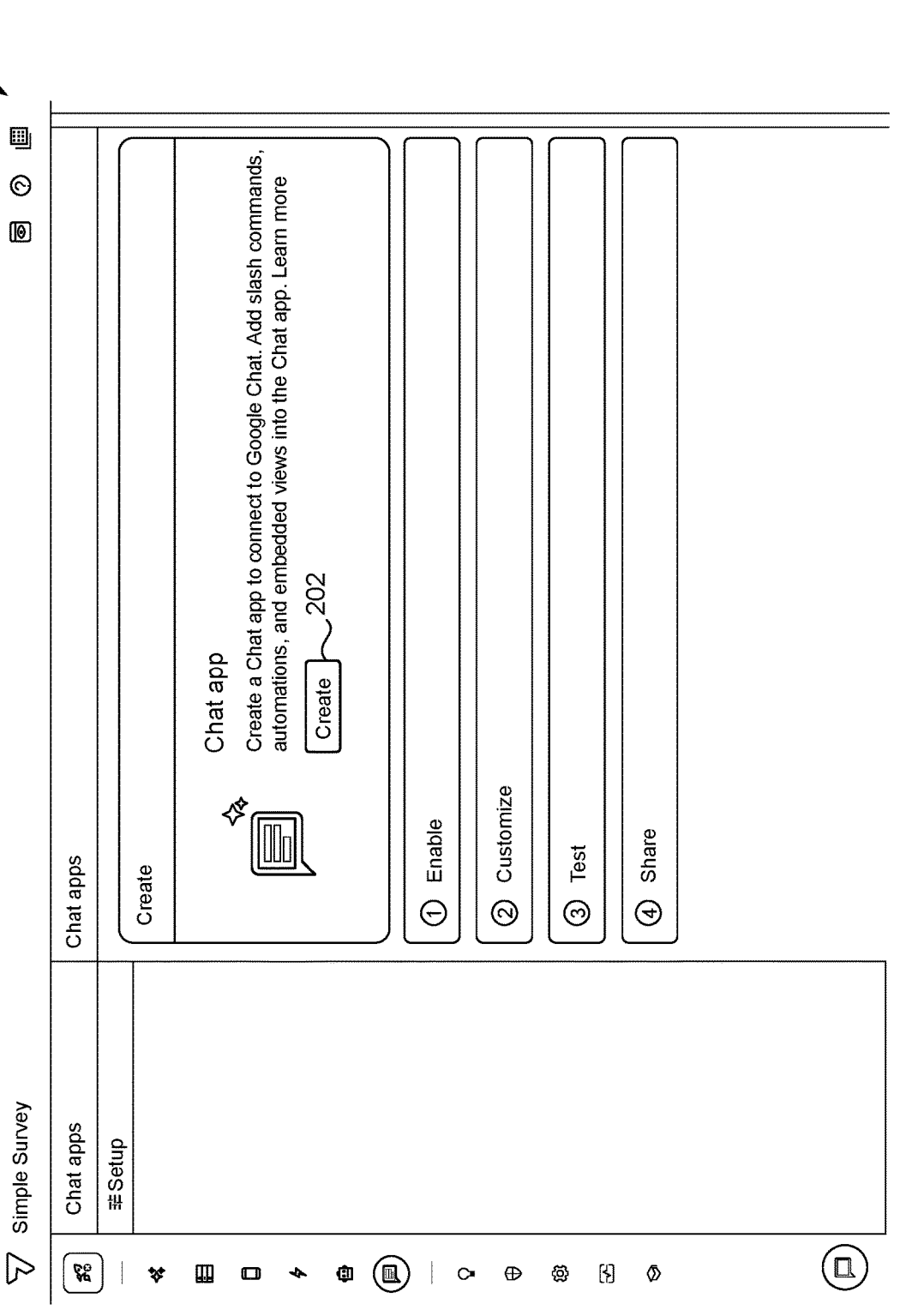
FIG. 2 is a schematic view of an initial chat application configuration view.
Figure 3A:
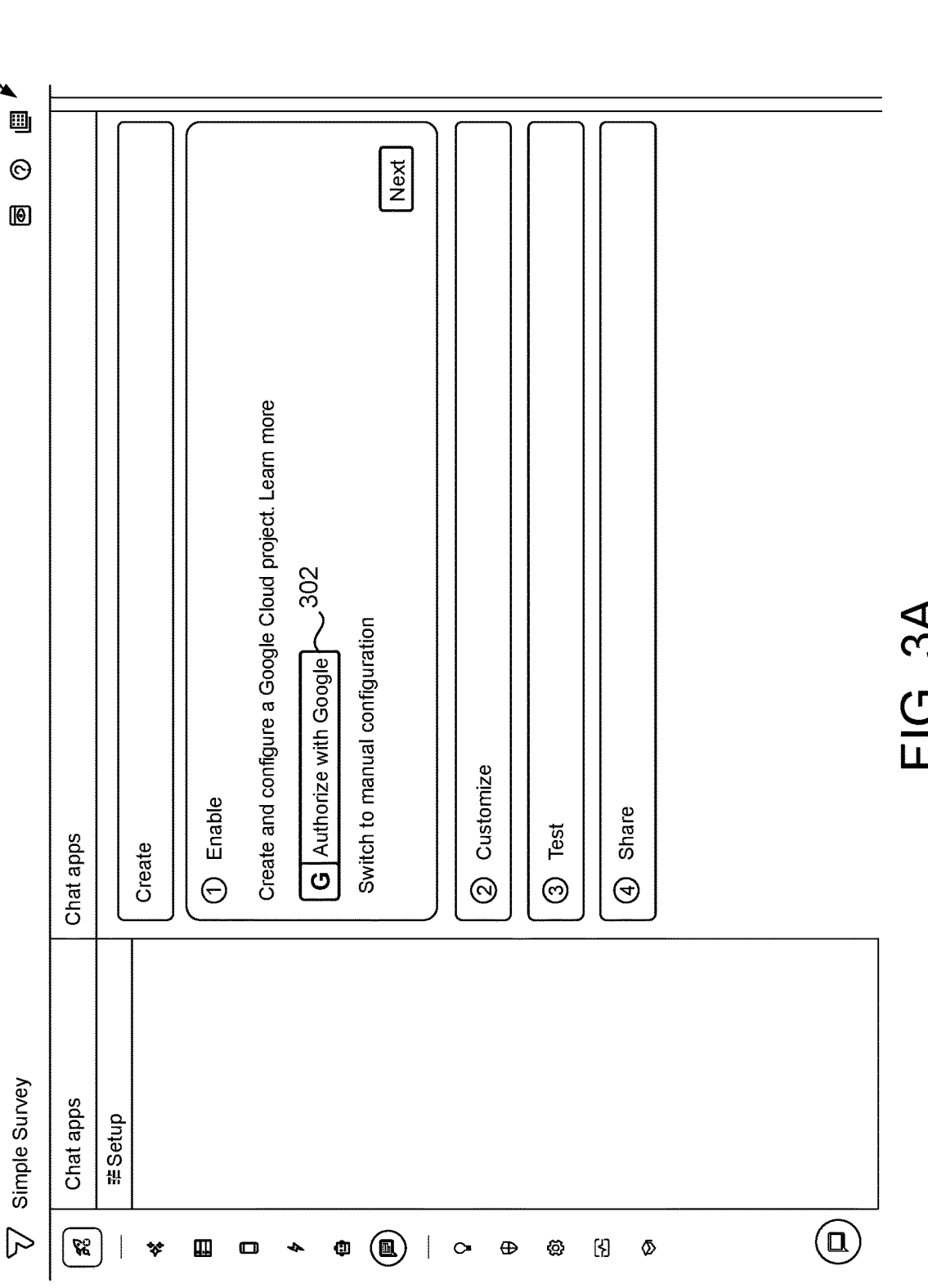
FIGS. 3A-3C are schematic views of enablement and authorization of a chat application.
Figure 3B:
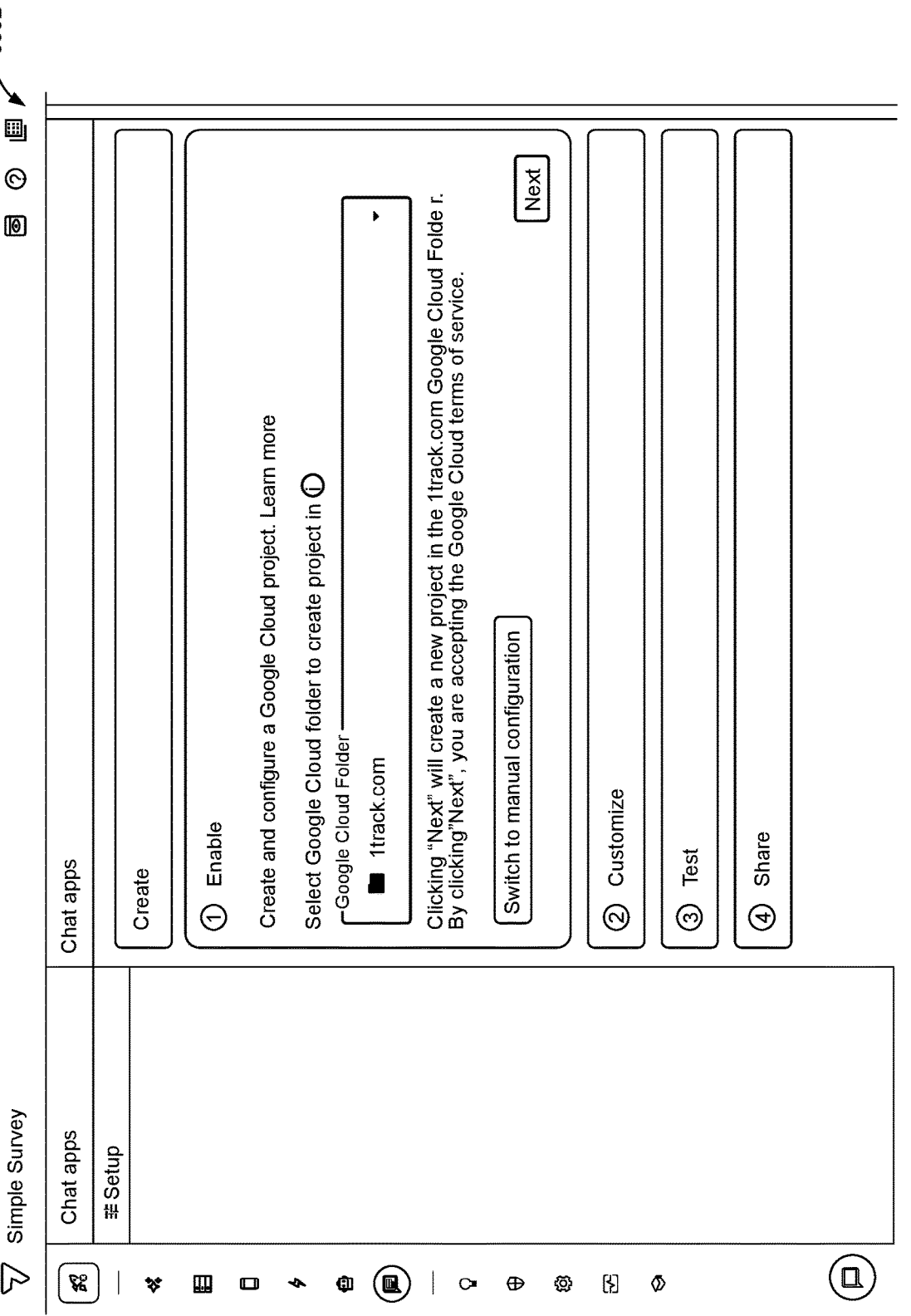
Figure 3C:
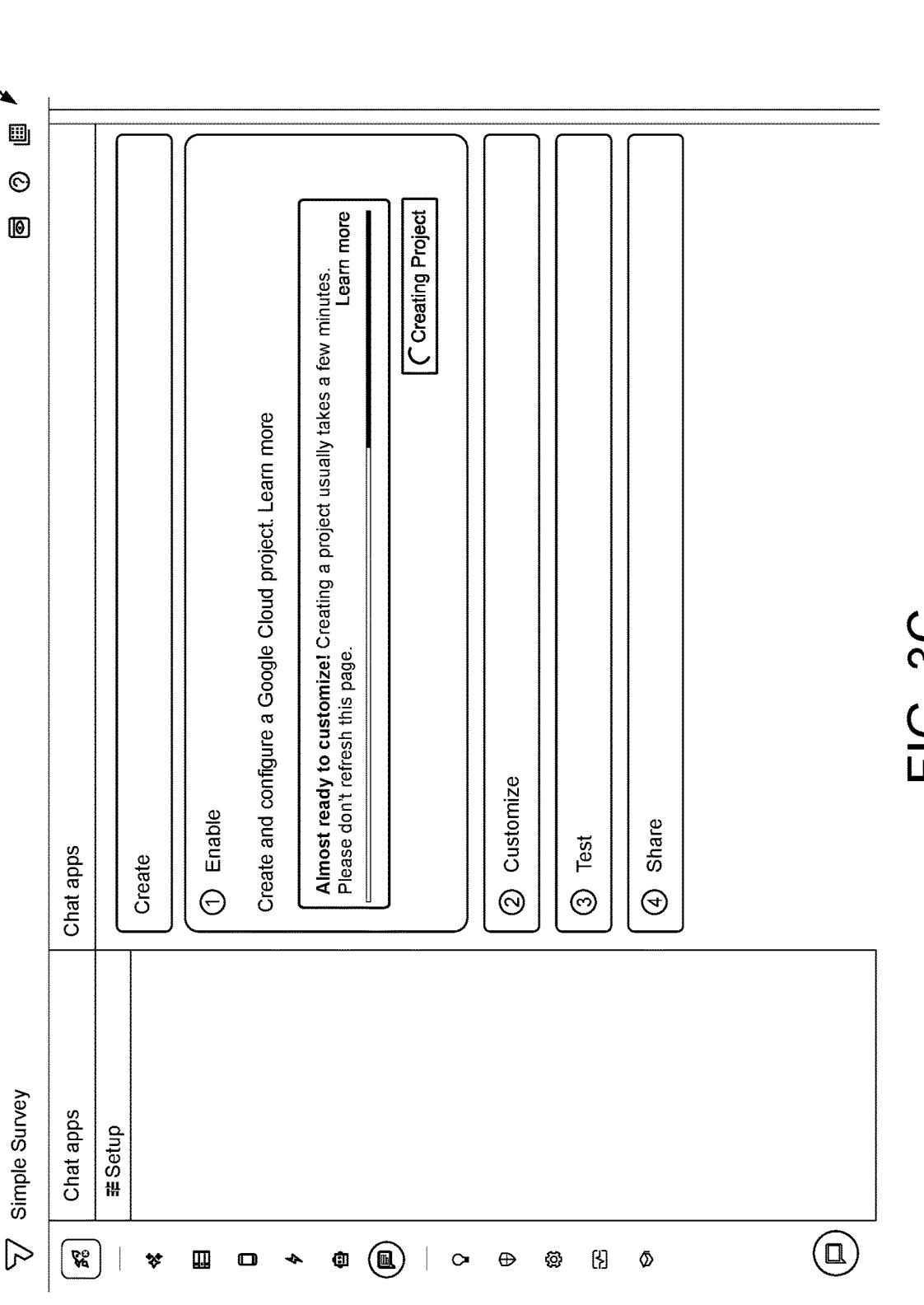

Referring now to FIG. 2, an exemplary GUI view 200 (e.g., displayed on GUI 14a for viewing by the user 12a) displays a chat application visual configuration initial view. Here, a user input 202 allows a user 12 to begin generation and configuration of the chat application 191. At FIGS. 3A-3C, exemplary GUI views 300A-C guide the user 12 through enablement of the generation of the chat application 191. The GUI view 300A includes an authorization user input 302, which may allow the user 12 to specify the credentials 173 to associate with the project container 194. At the GUI view 300B, the user 12 may specify a location (e.g., a folder or directory) to create the project container 194 After selecting a folder, the application controller 150 handles automatic generation of the project container 194 (e.g., programmatically via one or more APIs) without further input from the user 12. At the GUI view 300C, the user 12 may monitor progress of creation of the project container 194.

Figure 4A:
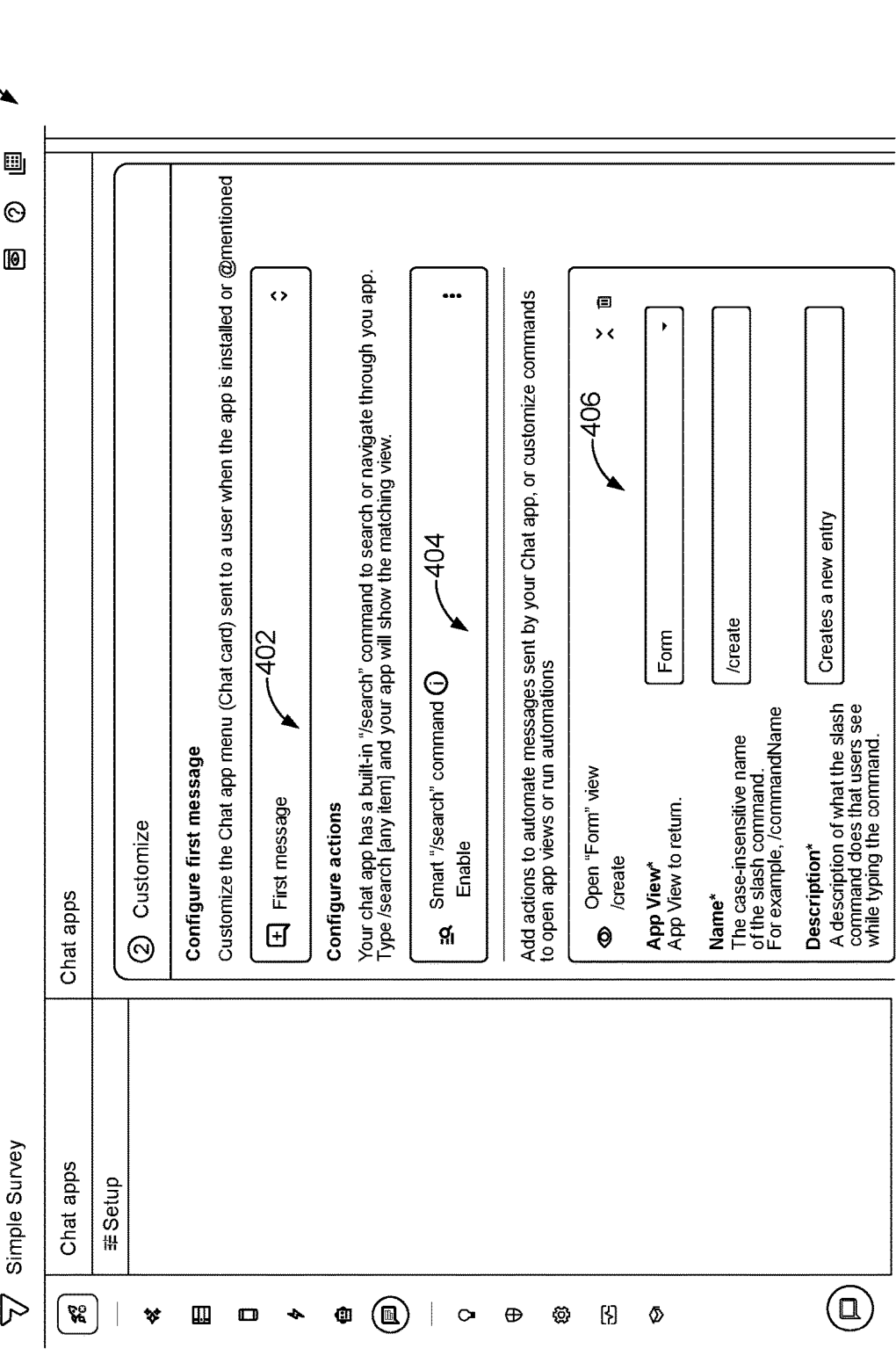
FIGS. 4A and 4B are schematic views of customization of a chat application.
Figure 4B:
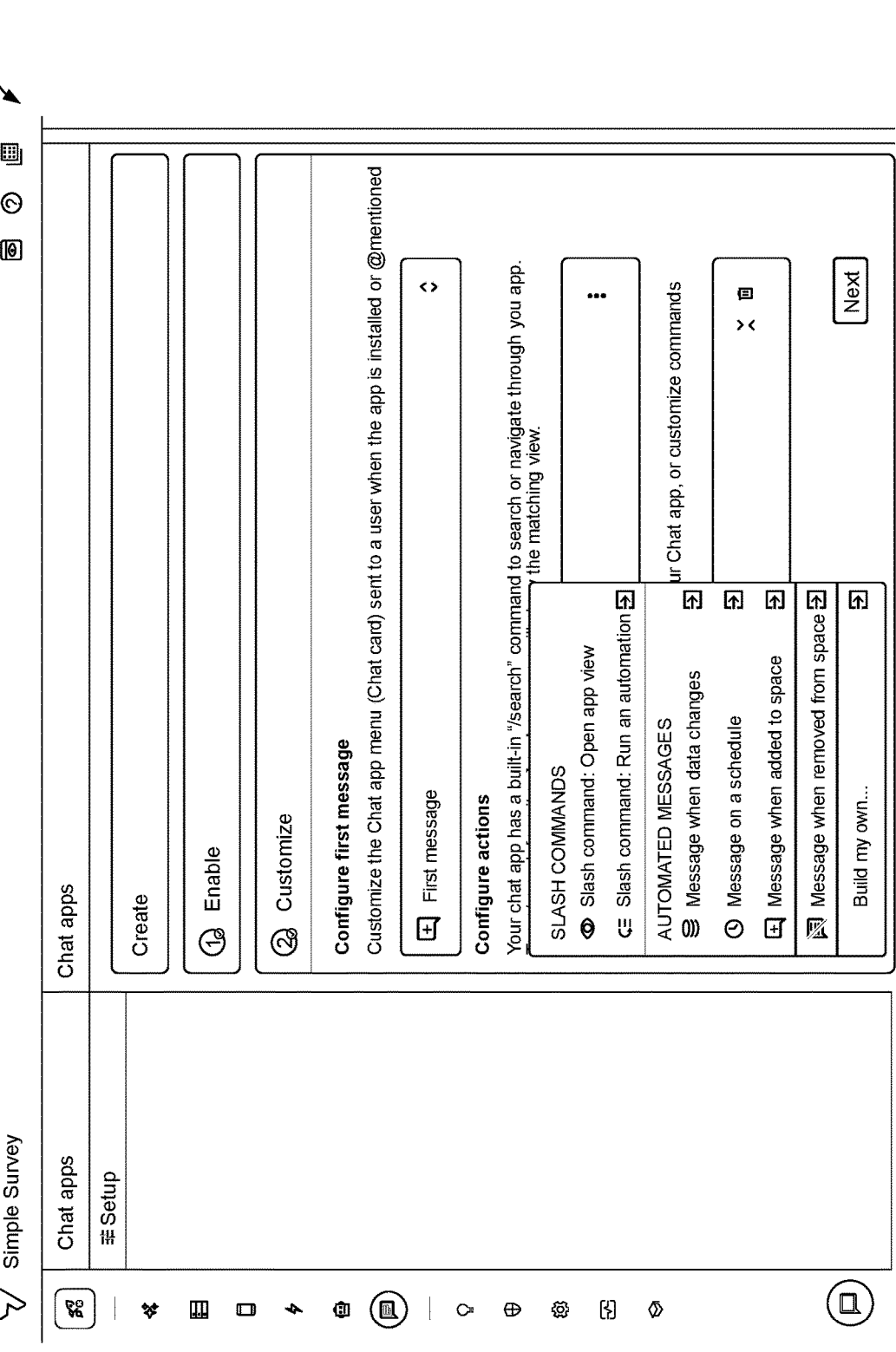

After the project container 194 is created, the user 12 may customize or configure the chat application 191. At FIG. 4A, an exemplary GUI view 400A provides the user 12 with several customization options. Here, the user may configure a message 402 that is presented to a user 12 when the user 12 first installs or adds the chat application 191 to their host application. The user 12 may configure one or more search commands 404. This customization allows the user 12 to specify specific search commands that search or navigate the chat application 191. The GUI view 400A also includes multiple template interactions (i.e., "recipes") for common chat application functionality. For example, the template interactions include slash command configuration 406 that allows the user 12 to select, name, and describe one or more slash commands. In this example, the user 12 has named a slash command "/create" with the description "Creates a new entry" and is configured to generate a "Form" view. As shown in FIG. 4B and with GUI view 400B, the user 12 may further customize actions of the slash command, such as configuring the slash command to open an application view, run an automation (i.e., a trigger and/or trigger action), and/or generate automated messages.

Figure 5A:
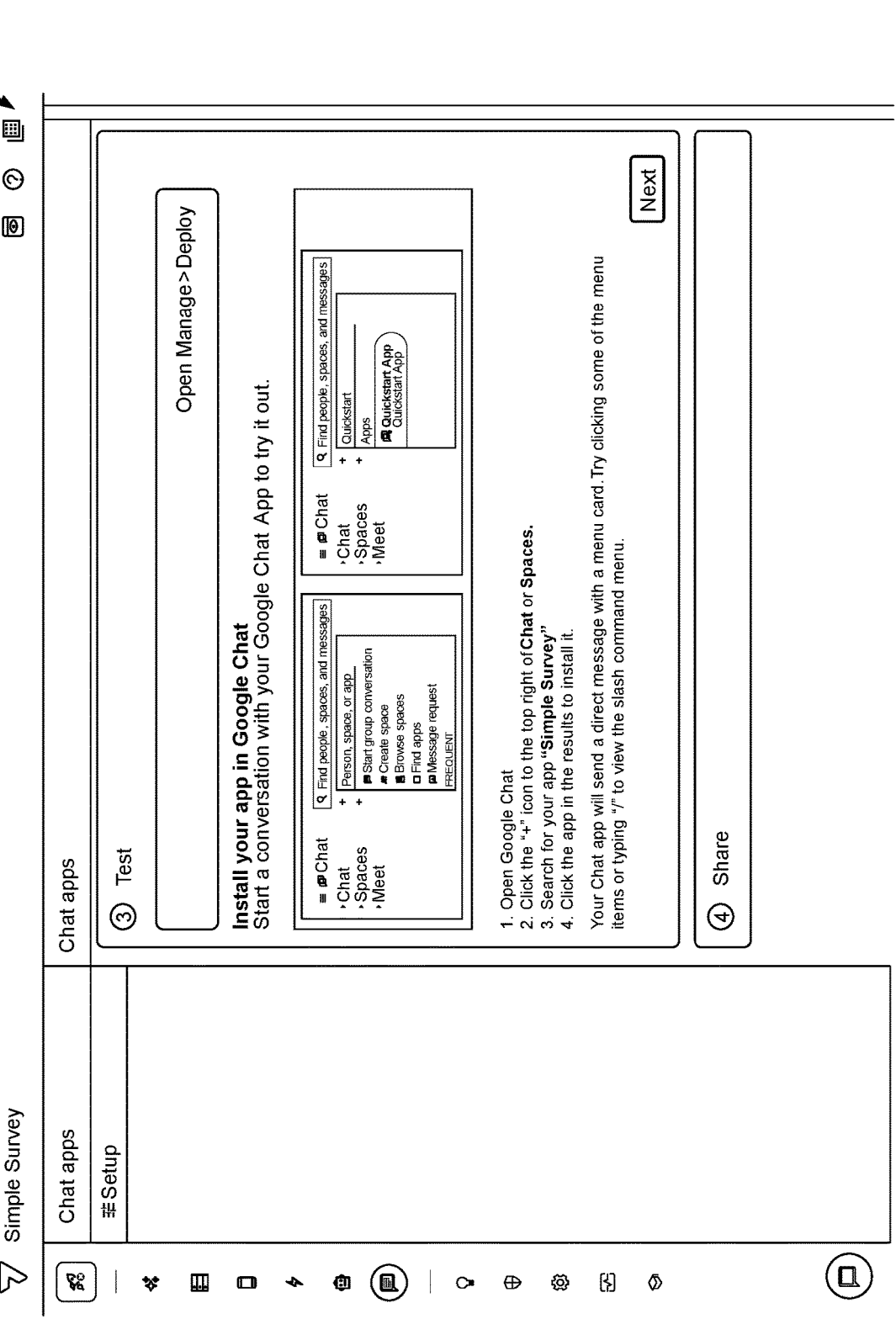
FIGS. 5A and 5B are schematic views of testing of a chat application.
Figure 5B:
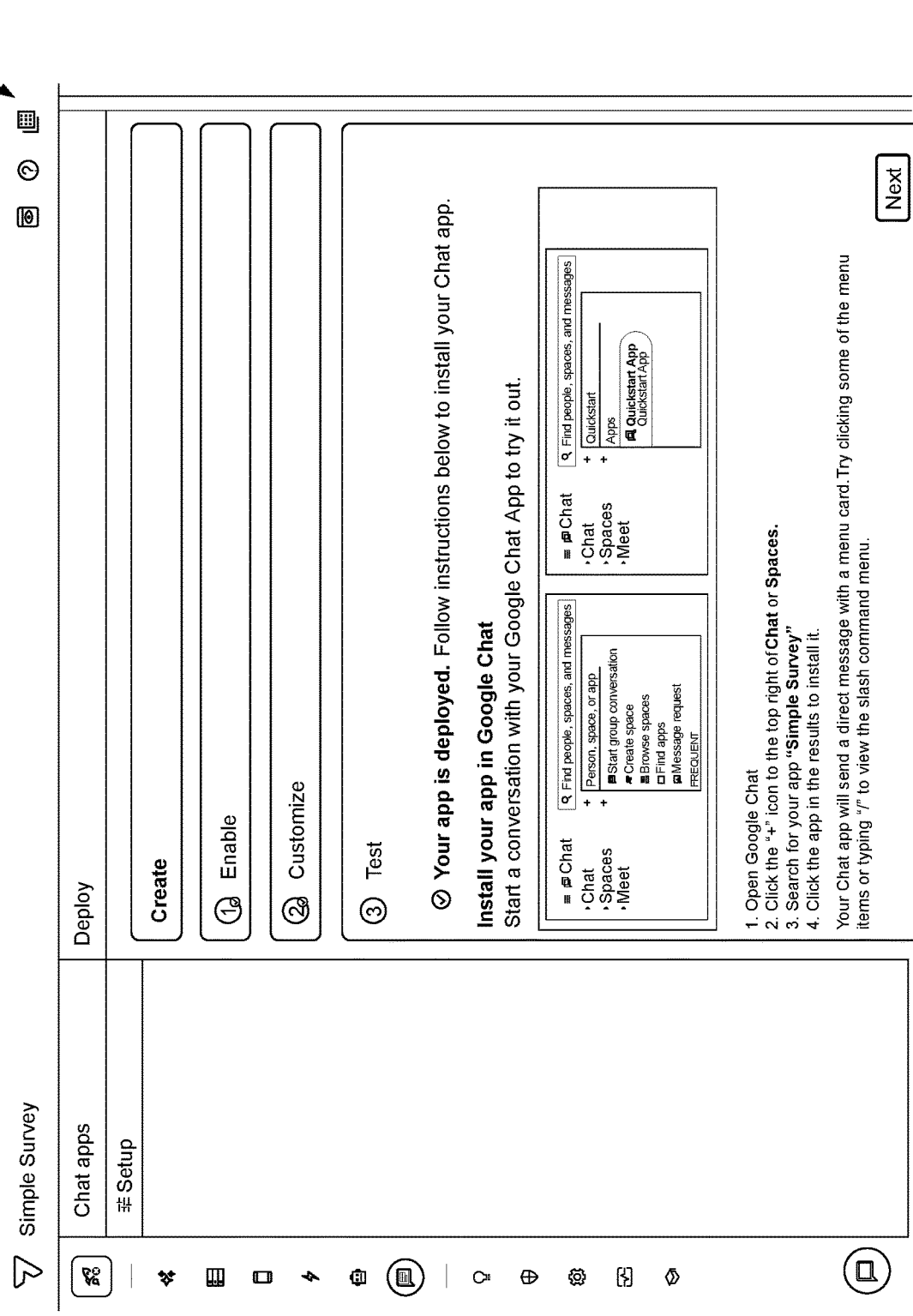

Referring now to FIGS. 5A and 5B, after configuring the chat application 191, the user 12 may test the chat application 191. In some examples, as shown in GUI view 500A of FIG. 5A, the chat application 191 must be deployed prior to testing. A GUI view 500B of FIG. 5B illustrates that, after deployment, the user 12 may be provided with explicit instructions on how to test the chat application 191. Here, the instructions include installation instructions.

Figure 6A:
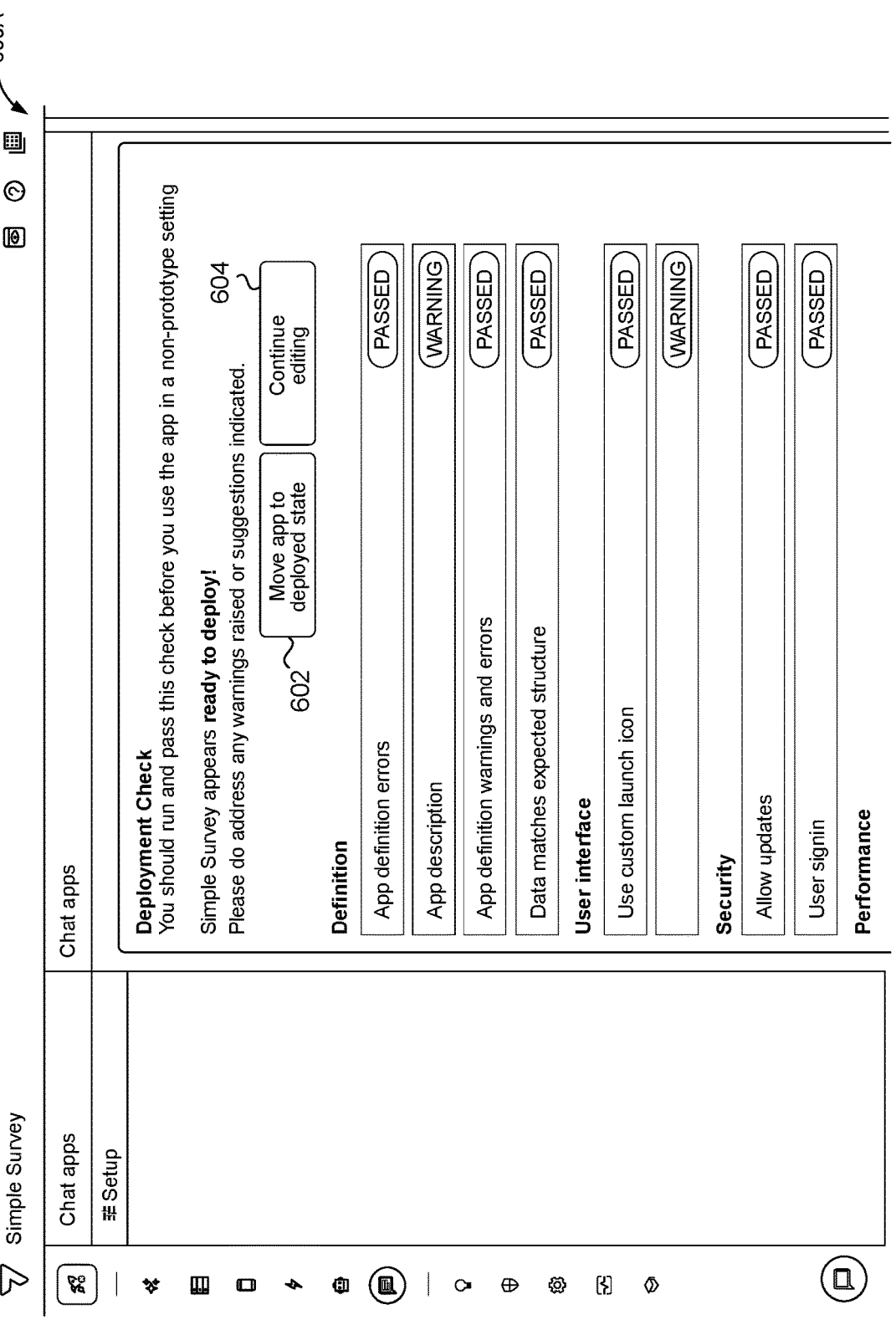
FIGS. 6A and 6B are schematic views of deployment checking of a chat application.

In some implementations, the application controller 150 performs one or more deployment checks on the chat application 191 prior to deployment. Referring now to FIG. 6A, a GUI view 600A illustrates an exemplary deployment check. The deployment check may analyze the chat application 191 for common warnings and errors. Here, the deployment check analyzes the chat application 191 for definition issues, user interface issues, security issues, and performance issues. The deployment check may raise warnings and errors. In some examples, errors may prohibit the user 12 from proceeding to deployment while warnings do not prohibit the user 12 from proceeding to deployment. In the example shown, the deployment check has determined warnings for the chat application description and for the standard menu design of the user interface. However, because these are only warnings and the application controller 150 found no errors, the user 12 may continue to deployment.

Figure 6B:
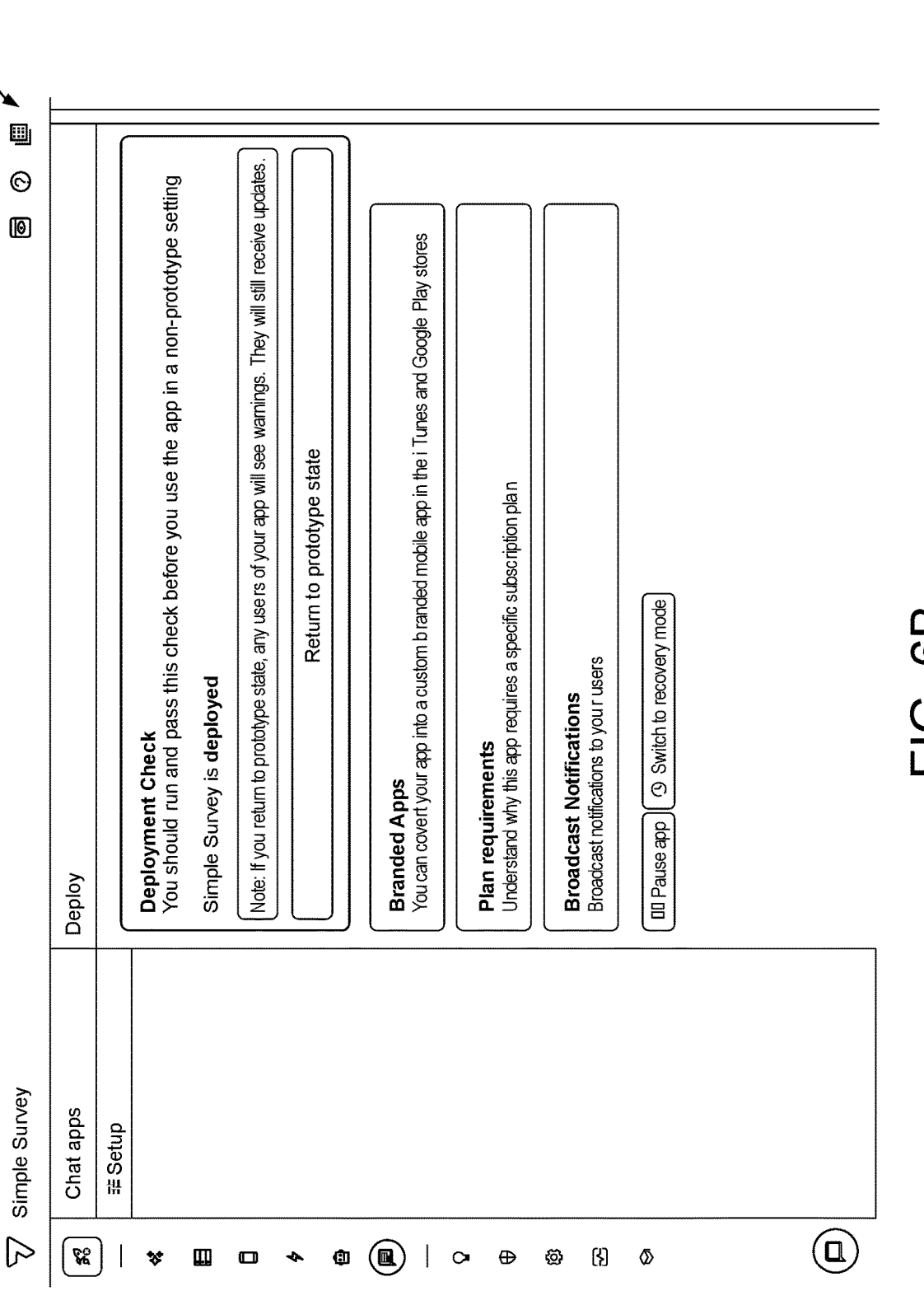

Each warning and/or error may provide a link for the user 12 to select. The link may forward the user 12 to the applicable configuration settings to address the warning or error. For example, the user 12 may select the "App description" warning and the user 12 may be directed to a text field where the user 12 may update the description of the chat application 191. Here, the GUI view 600A includes a deployment user input 602 and a continue editing user input. While the continue editing user input 604 may return the user 12 to the previous configuration of the chat application 191, the deployment user input 602 may deploy the chat application 191 for use. The deployment user input 602 may only be selectable by the user 12 after the deployment check has been passed. FIG. 6B illustrates a GUI view 600B after the user 12 selects to deploy the chat application 191. Here, the user 12 is presented with a message indicating that the chat application 191 has been successfully deployed.

Figure 7A:
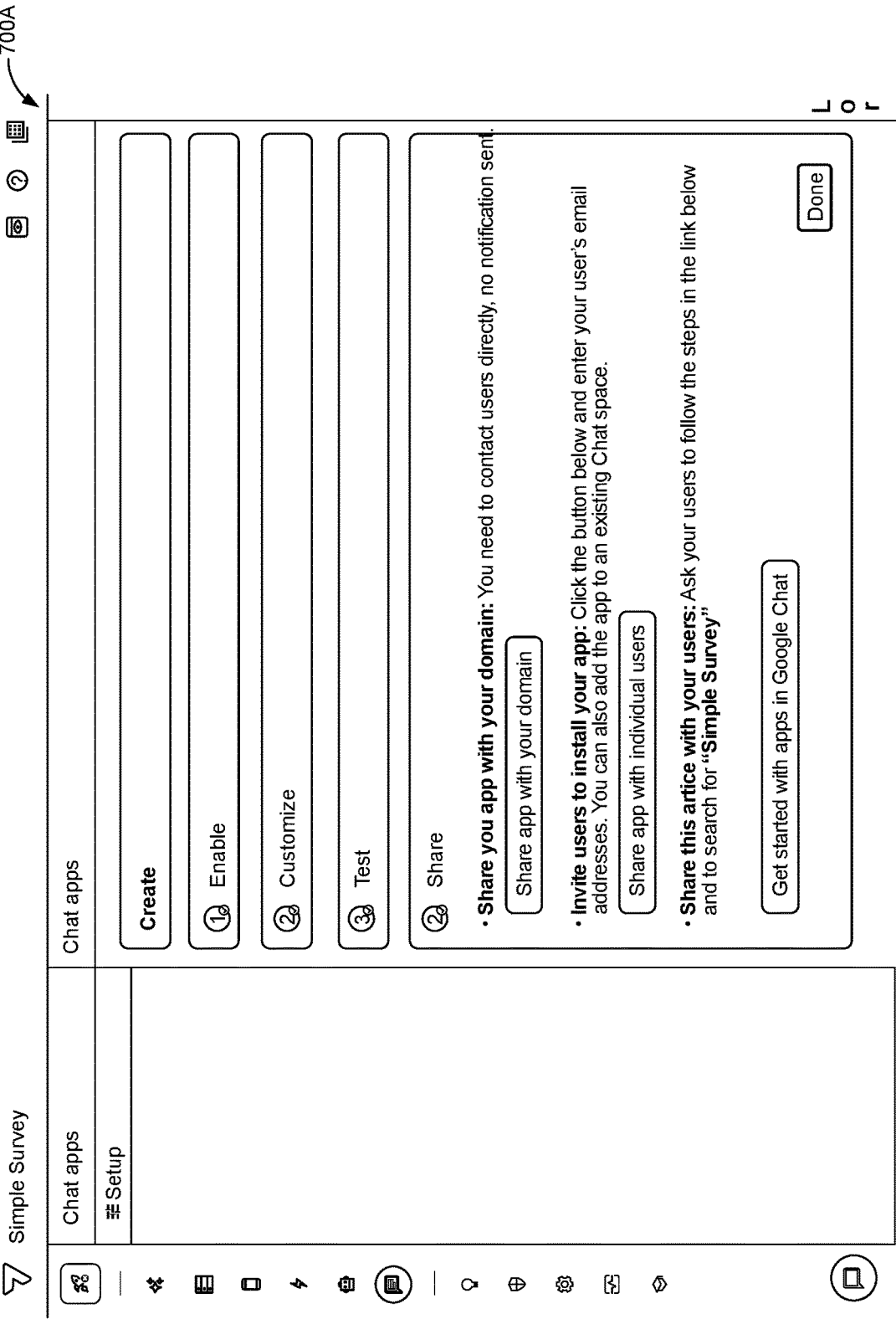
FIGS. 7A and 7B are schematic views of sharing options for a chat application.
Figure 7B:
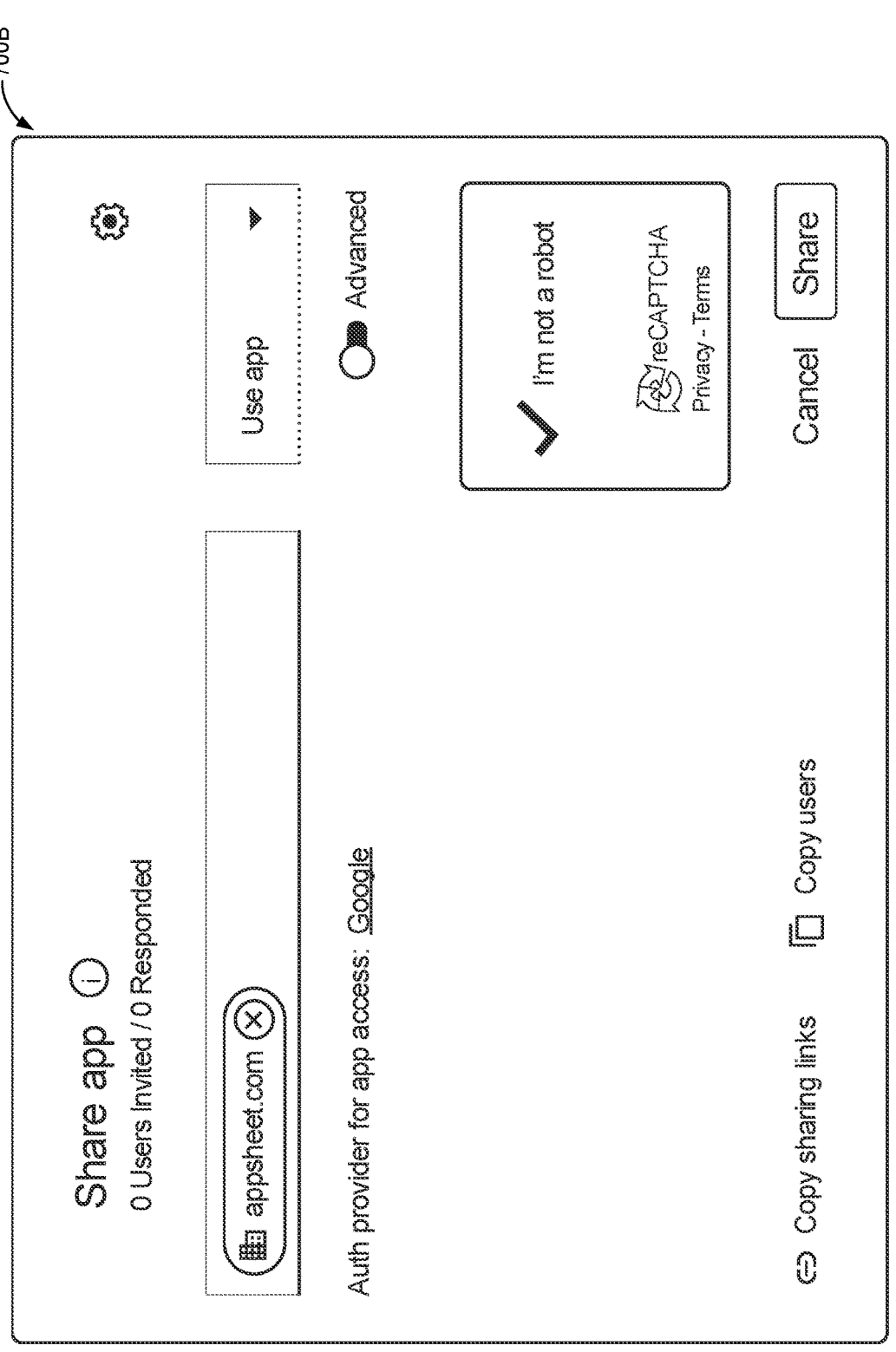

After deploying the chat application 191, the application controller 150 may solicit sharing instructions from the user 12. As shown in FIG. 7A with GUI view 700A, the user 12 may select to share the chat application 191 with a specific domain or with individual users. That is, the user 12 may granularly control who may add or access the chat application 191 after deployment. For example, the user 12 may limit usage of the chat application 191 to specific people or specific groups/departments/domains within an organization. As shown in FIG. 7B, a GUI view 700B may allow the user 12 to specify users of the chat application 191 in any number of ways, such as by entering email addresses, copying links, etc.

Figure 8A:
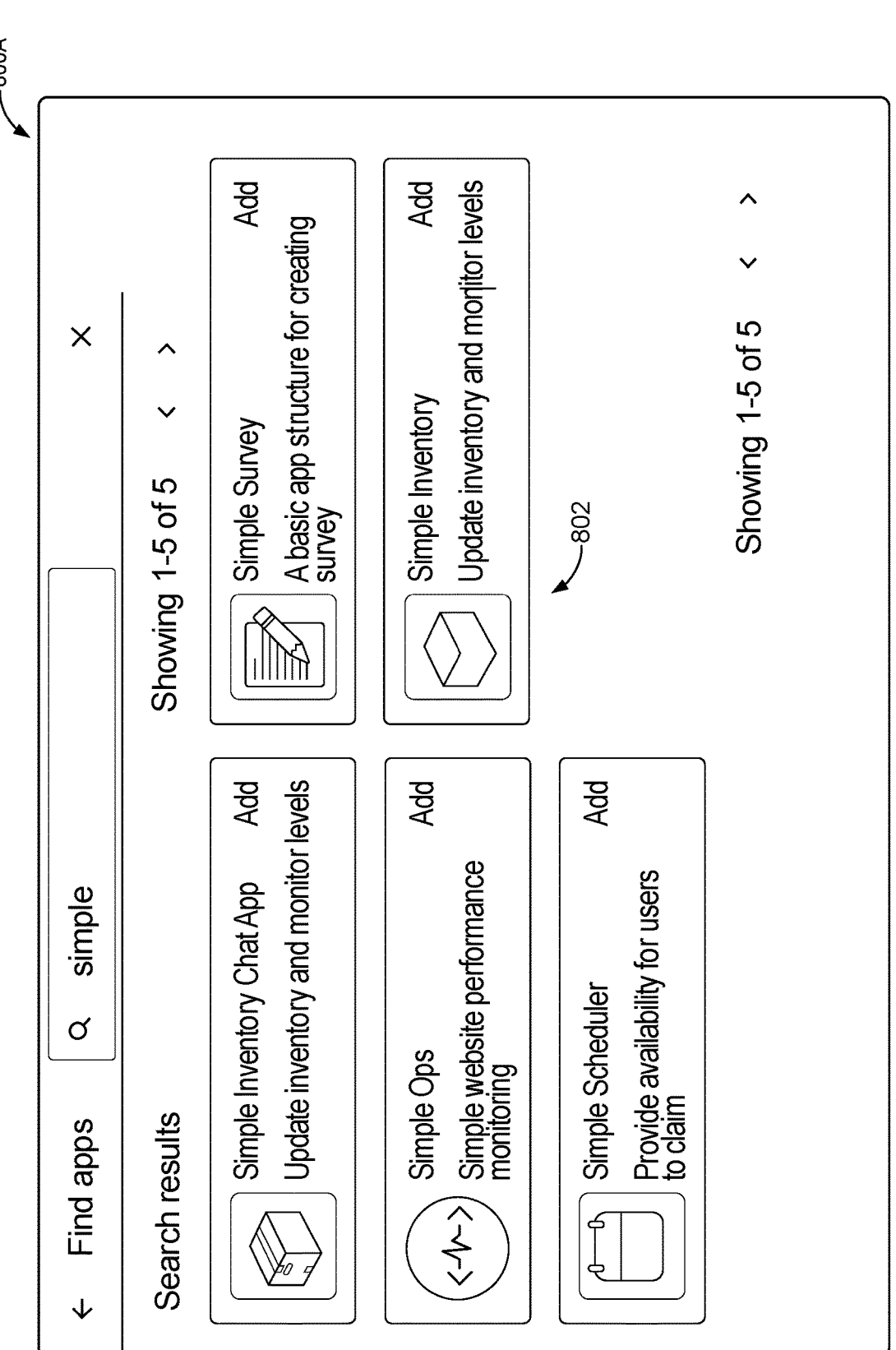
FIGS. 8A-8C are schematic views of adding a chat application to a host application.
Figure 8B:
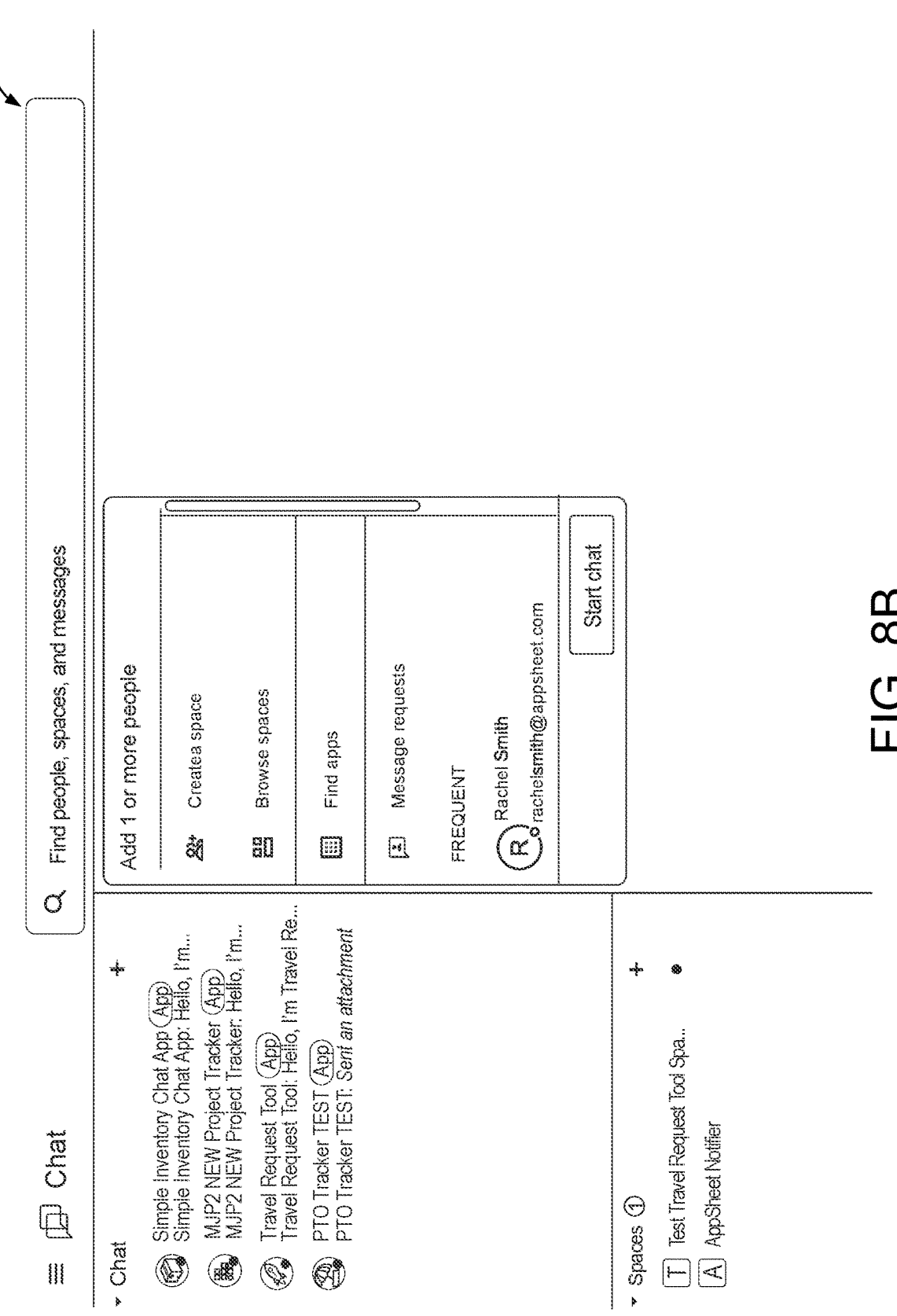
Figure 8C:
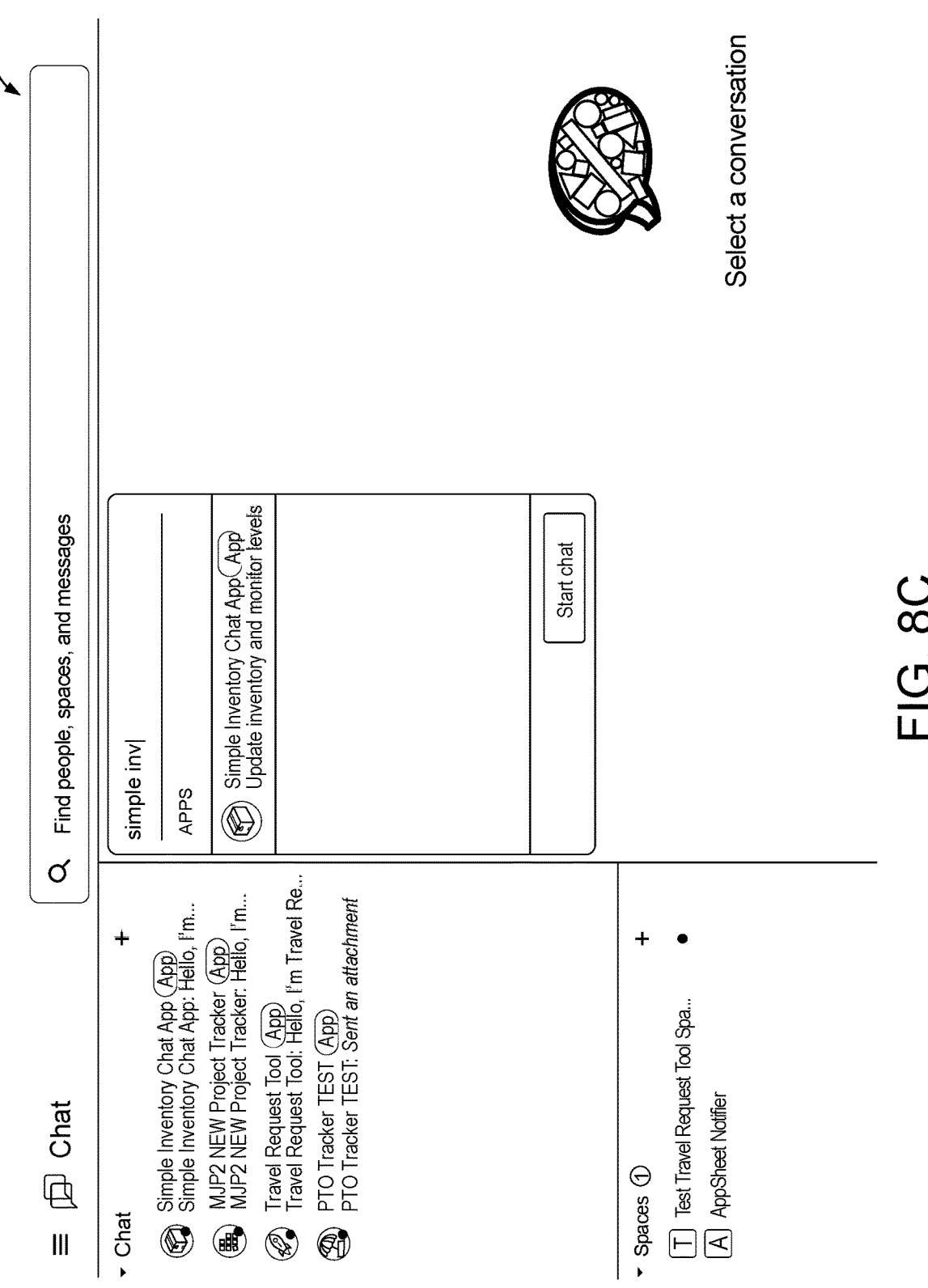

After the chat application 191 has been deployed, the application controller 150 may allow the chat application 191 to be added by users 12 in any number of ways. In FIG. 8A, a GUI view 800A includes a user searching for chat applications 191 view a "Find Apps" pop-up window that includes a gallery. The gallery includes tiles 802 that represent matching chat applications that allow the user 12 to easily select and add a chat application 191 that matches one or more search terms. FIG. 8B and GUI view 800B illustrates another method that the user 12 may use to add chat applications 191 to a host application. Here, the user 12 selects a "+" button to add entities to a chat and then selects "Find apps." Selection of "Find apps," as shown in GUI view 800C of FIG. 8C, allows the user 12 to enter one or more search terms to search for a specific chat application 191.

Figure 9A:
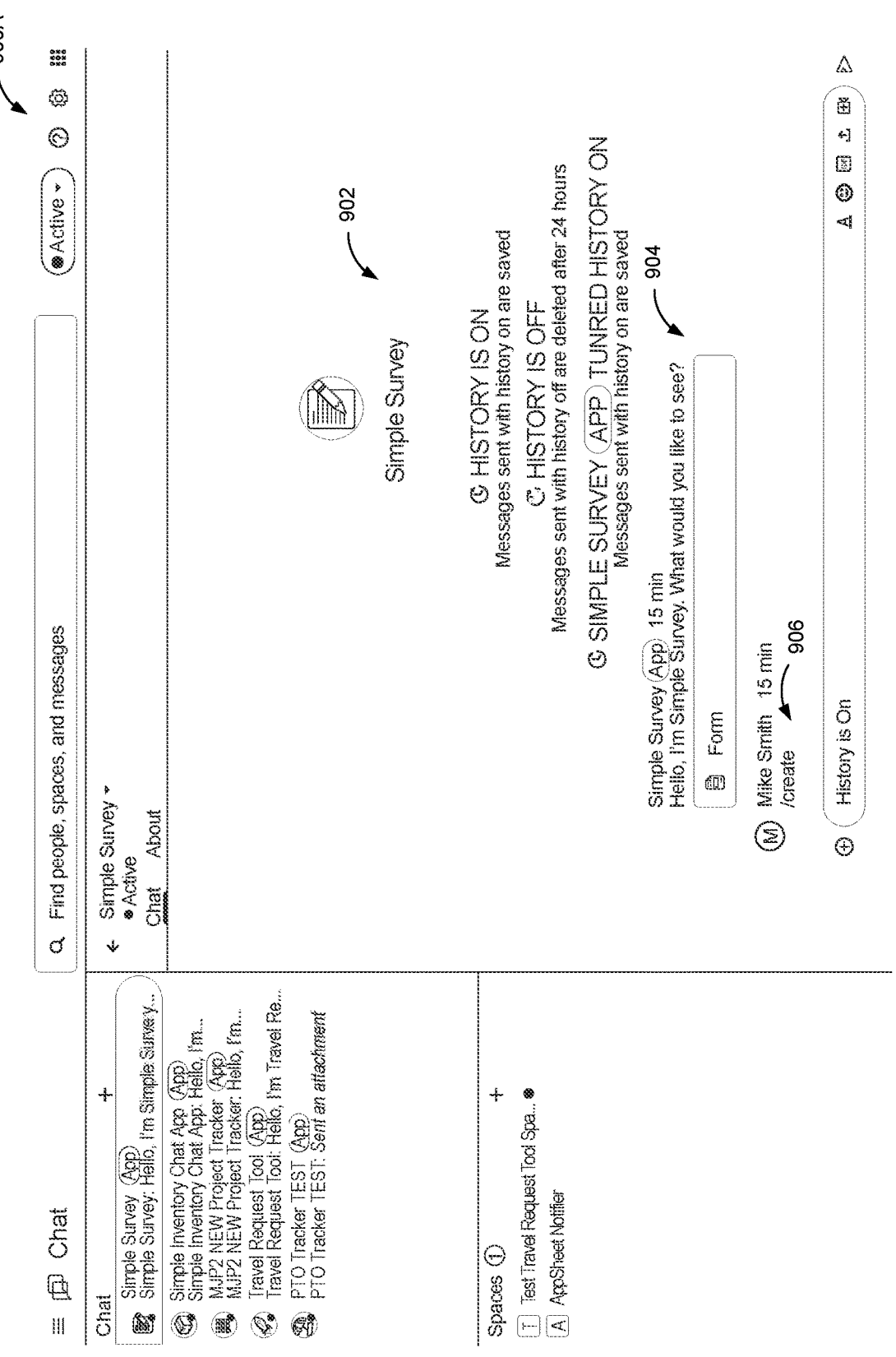
FIGS. 9A and 9B are schematic views of user interactions with a chat application.
Figure 9B:
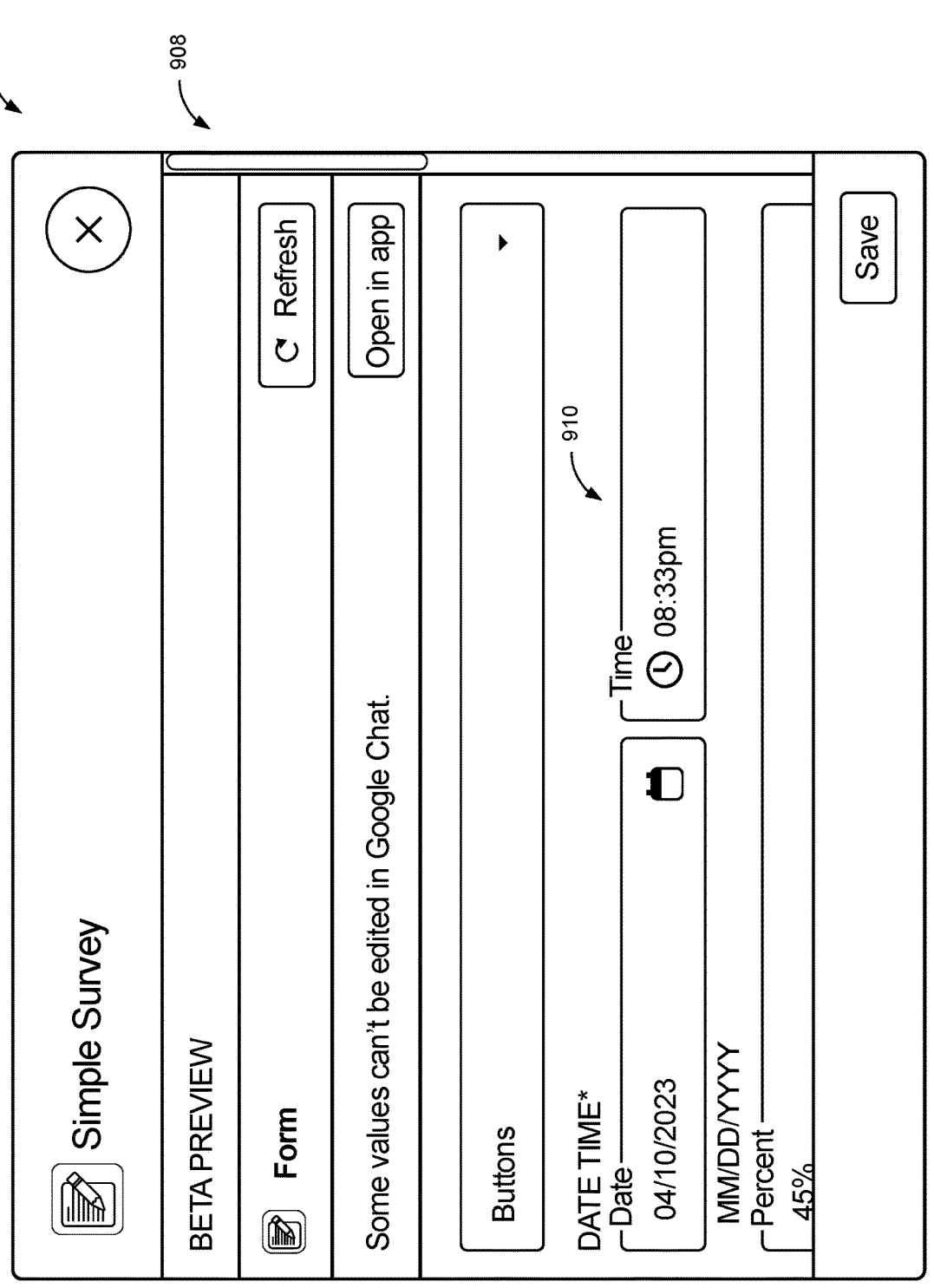

Once the user 12 adds the chat application 191 to the host application, the user 12 may interact with the chat application 191 in the manner configured by the editor (i.e., the user 12a) of the chat application 191. In the example of FIGS. 9A and 9B, the user 12 has added a chat application 191 titled "Simple Survey" to an instant messaging host application. Here, a GUI view 900A shows that the chat application 191 has a splash screen 902 giving the title of the chat application 191 and other relevant parameters (e.g., history). The chat application 191 also has provided an introductory message 904 (as configured by the editor of the chat application 191). In this example, the user 12 of the chat application 191 has provided a slash command 906 (i.e., "/create"). Continuing the example with FIG. 9B, a GUI view 900B illustrates the response of the chat application 191 to the slash command 906. In this example, the chat application 191 responds with a pop-up 908 that provides multiple fields 910 that allow the user 12 to provide data to the chat application 191. Here, once the user 12 enters one or more of the fields 910 and selects the "Save" input, a data record will be created in an underlying database associated with the chat application 191. This action is purely exemplary, and the chat application 191 may undertake any number of other actions in addition to or alternative to record creation (e.g., generating an email, generating a text message, sending a chat message to one or more other users, generate an approval ticket, etc., display records from a database, etc.).

FIG. 10 is a flowchart of an exemplary arrangement of operations for a method 1000 of configuration and deploying chat application. The method 1000, when executed by data processing hardware 144, causes the data processing hardware 144 to perform operations. At operation 1002, the method 1000 includes receiving, from a user 12a, a chat application deployment request 24 requesting deployment of a chat application 191. The chat application 191 is derived from a no-code application 190 and the no-code application 190 is generated using a no-code application development environment. The method 1000, at operation 1004, includes obtaining credentials 173 associated with the user 12a and, at operation 1006, generating, using the credentials 173, a project container 194 for the chat application 191. At operation 1008, the method 1000 includes generating, using the no-code application 190 and the no-code application development environment, the chat application 191 at the project container 194. The method 1000, at operation 1010, includes receiving, from the user 12a, parameters 26 for the chat application 191. The parameters 26 define user interaction with the chat application 191. At operation 1012, the method 1000 includes configuring, via an application programming interface (API), the chat application 191 using the parameters 26. The method 1000, at operation 1014, includes deploying the chat application 191. The deployed chat application 191 is available for use by end users 12 within a host application.

Figure 11:
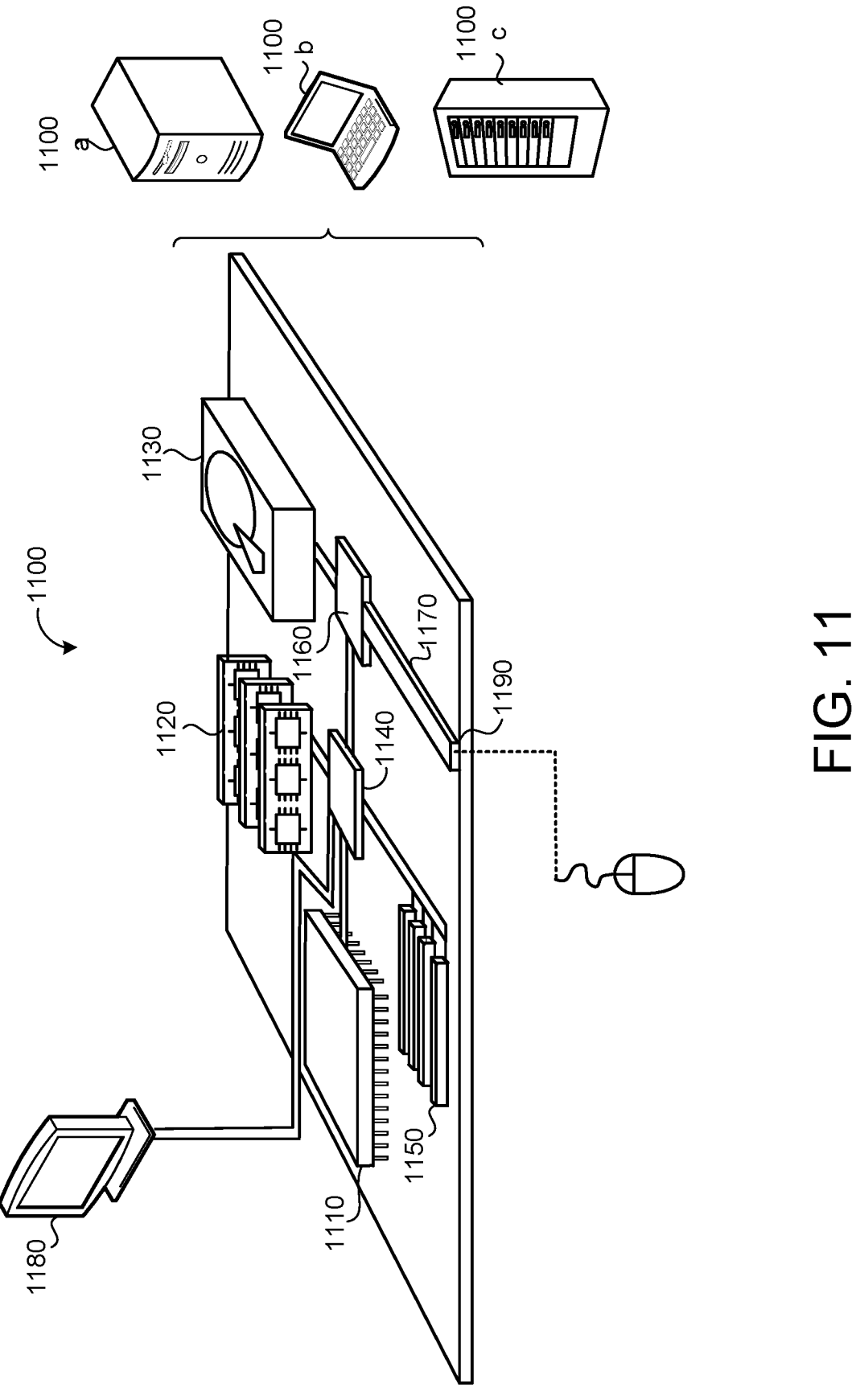
FIG. 11 is a schematic view of an example computing device that may be used to implement the systems and methods described herein.

FIG. 11 is a schematic view of an example computing device 1100 that may be used to implement the systems and methods described in this document. The computing device 1100 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1100 includes a processor 1110, memory 1120, a storage device 1130, a high-speed interface/controller 1140 connecting to the memory 1120 and high-speed expansion ports 1150, and a low speed interface/controller 1160 connecting to a low speed bus 1170 and a storage device 1130. Each of the components 1110, 1120, 1130, 1140, 1150, and 1160, are interconnected using various busses, and may be mounted on a common motherboard or in other manners as appropriate. The processor 1110 can process instructions for execution within the computing device 1100, including instructions stored in the memory 1120 or on the storage device 1130 to display graphical information for a graphical user interface (GUI) on an external input/output device, such as display 1180 coupled to high speed interface 1140. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1120 stores information non-transitorily within the computing device 1100. The memory 1120 may be a computer-readable medium, a volatile memory unit(s), or non-volatile memory unit(s). The non-transitory memory 1120 may be physical devices used to store programs (e.g., sequences of instructions) or data (e.g., program state information) on a temporary or permanent basis for use by the computing device 1100. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1130 is capable of providing mass storage for the computing device 1100. In some implementations, the storage device 1130 is a computer-readable medium. In various different implementations, the storage device 1130 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1120, the storage device 1130, or memory on processor 1110.

The high speed controller 1140 manages bandwidth-intensive operations for the computing device 1100, while the low speed controller 1160 manages lower bandwidth-intensive operations. Such allocation of duties is exemplary only. In some implementations, the high-speed controller 1140 is coupled to the memory 1120, the display 1180 (e.g., through a graphics processor or accelerator), and to the high-speed expansion ports 1150, which may accept various expansion cards (not shown). In some implementations, the low-speed controller 1160 is coupled to the storage device 1130 and a low-speed expansion port 1190. The low-speed expansion port 1190, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1100*a* or multiple times in a group of such servers 1100*a*, as a laptop computer 1100*b*, or as part of a rack server system 1100*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
receiving, by data processing hardware and from a user, a chat application deployment request requesting deployment of a chat application, the chat application derived from a no-code application, the no-code application generated using a no-code application development environment;
obtaining, by the data processing hardware, credentials associated with the user;
generating, by the data processing hardware and using the credentials, a project container for the chat application;

generating, by the data processing hardware and using the no-code application and the no-code application development environment, the chat application at the project container;
receiving, by the data processing hardware and from the user, parameters for the chat application, the parameters defining user interaction with the chat application, wherein the parameters include one or more slash commands for the chat application;
configuring, by the data processing hardware and via an application programming interface (API), the chat application using the parameters; and
deploying, by the data processing hardware, the chat application, the deployed chat application available for use by end users within a host application, the host application being a second chat application.

2. The method of claim 1, wherein the credentials are uniquely associated with the user.

3. The method of claim 1, wherein:
the user is associated with an organization; and
the credentials are uniquely associated with the organization.

4. The method of claim 3, wherein the project container is programmatically generated within a cloud platform instance associated with the organization.

5. The method of claim 1, wherein the no-code application is generated prior to receiving the chat application deployment request.

6. The method of claim 1, wherein the one or more slash commands comprise one or more of:
a slash command to open an application view configured to view, create, or modify a data record;
a slash command to trigger an action of the no-code application; or
a slash command to perform natural language searching of one or more data records associated with the chat application.

7. The method of claim 1, wherein the parameters comprise one or more of:
a name associated with the chat application;
a description of the chat application; or
a slash command definition.

8. The method of claim 1, wherein receiving the parameters comprises:
generating one or more template interactions, each template interaction of the one or more template interactions defining an interaction with the chat application;
sending the one or more template interactions to a user device associated with the user; and
receiving, from the user, selection of one of the one or more template interactions.

9. The method of claim 8, wherein at least one of the one or more template interactions is derived from interactions defined in the no-code application.

10. The method of claim 6, wherein the one or more data records associated with the chat application include data records sourced from the host application or external data sources.

11. The method of claim 1, wherein the end users able to use the deployed chat application include at least one of:
members of an organization to which the user belongs;
end users not affiliated with the organization to which the user belongs; or
consumers utilizing the host application.

12. A computing system comprising:

data processing hardware; and memory hardware in communication with the data processing hardware, the memory hardware storing instructions that when executed on the data processing hardware cause the data processing hardware to:

receive, from a user, a chat application deployment request requesting deployment of a chat application, the chat application derived from a no-code application, the no-code application generated using a no-code application development environment;

obtain credentials associated with the user;

generate, using the credentials, a project container for the chat application;

generate, using the no-code application and the no-code application development environment, the chat application at the project container;

receive, from the user, parameters for the chat application, the parameters defining user interaction with the chat application, wherein the parameters include one or more slash commands for the chat application;

configure, via an application programming interface (API), the chat application using the parameters; and deploy the chat application, the deployed chat application available for use by end users within a host application, the host application being a second chat application.

13. The computing system of claim 12, wherein the credentials are uniquely associated with the user.

14. The computing system of claim 12, wherein:

the user is associated with an organization; and the credentials are uniquely associated with the organization.

15. The computing system of claim 14, wherein the project container is programmatically generated within a cloud platform instance associated with the organization.

16. The computing system of claim 12, wherein the no-code application is generated prior to receiving the chat application deployment request.

17. The computing system of claim 12, wherein the one or more slash commands comprise one or more of:

a slash command to open an application view configured to view, create, or modify a data record;

a slash command to trigger an action of the no-code application; or a slash command to perform natural language searching of one or more data records associated with the chat application.

18. The computing system of claim 12, wherein the parameters comprise one or more of:

a name associated with the chat application;

a description of the chat application; or a slash command definition.

19. The computing system of claim 12, wherein to receive the parameters, the instructions further cause the data processing to:

generate one or more template interactions, each template interaction of the one or more template interactions defining an interaction with the chat application;

send the one or more template interactions to a user device associated with the user; and receive, from the user, selection of one of the one or more template interactions.

20. The computing system of claim 19, wherein at least one of the one or more template interactions is derived from interactions defined in the no-code application.

* * * * *